United States Patent
Carothers

(10) Patent No.: US 10,127,712 B2
(45) Date of Patent: Nov. 13, 2018

(54) IMMERSIVE CONTENT FRAMING

(71) Applicant: Lytro, Inc., Mountain View, CA (US)

(72) Inventor: Trevor Carothers, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/205,494

(22) Filed: Jul. 8, 2016

(65) Prior Publication Data

US 2018/0012397 A1    Jan. 11, 2018

(51) Int. Cl.
| | | |
|---|---|---|
| *G06T 13/20* | (2011.01) | |
| *G06T 15/08* | (2011.01) | |
| *G06T 15/20* | (2011.01) | |
| *G06T 15/50* | (2011.01) | |
| *G06T 19/00* | (2011.01) | |

(52) U.S. Cl.
CPC ............. *G06T 15/20* (2013.01); *G06T 13/20* (2013.01); *G06T 15/08* (2013.01); *G06T 15/506* (2013.01); *G06T 19/006* (2013.01); *G06T 2207/10021* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 2002/0061131 | A1* | 5/2002 | Sawhney ............. | G06T 15/205 382/154 |
| 2014/0267639 | A1* | 9/2014 | Tatsuta ............... | H04N 13/0404 348/59 |
| 2016/0191823 | A1* | 6/2016 | El-Ghoroury ...... | H04N 13/0207 348/340 |

OTHER PUBLICATIONS

Koltun et al. "Virtual Occluders: An Efficient Interediate PVS Representation", Rendering Techniques 2000: Proc. 11th Eurographics Workshop Rendering, pp. 59-70, Jun. 2000.*
"The Surrogate", VR Playhouse, http://www.vrplayhouse.com/the-surrogate.

* cited by examiner

*Primary Examiner* — Yingchun He

(57) ABSTRACT

A virtual view of a scene may be generated through the use of various systems and methods. In one exemplary method, from a tiled array of cameras, image data may be received. The image data may depict a capture volume comprising a scene volume in which a scene is located. A viewing volume may be defined. A virtual occluder may be positioned at least partially within the capture volume such that a virtual window of the virtual occluder is between the viewing volume and the scene. A virtual viewpoint within the viewing volume may be selected. A virtual view may be generated to depict the scene from the virtual viewpoint.

46 Claims, 25 Drawing Sheets

| | | | | | |
|---|---|---|---|---|---|
| V1 | V2 | V3 | V4 | V5 | V6 |
| ^P3 | * | ^P1 ^P3 ^P4 | ^P1 ^P2 | ^P2 ^P3 | ^P1 ^P3 ^P6 |

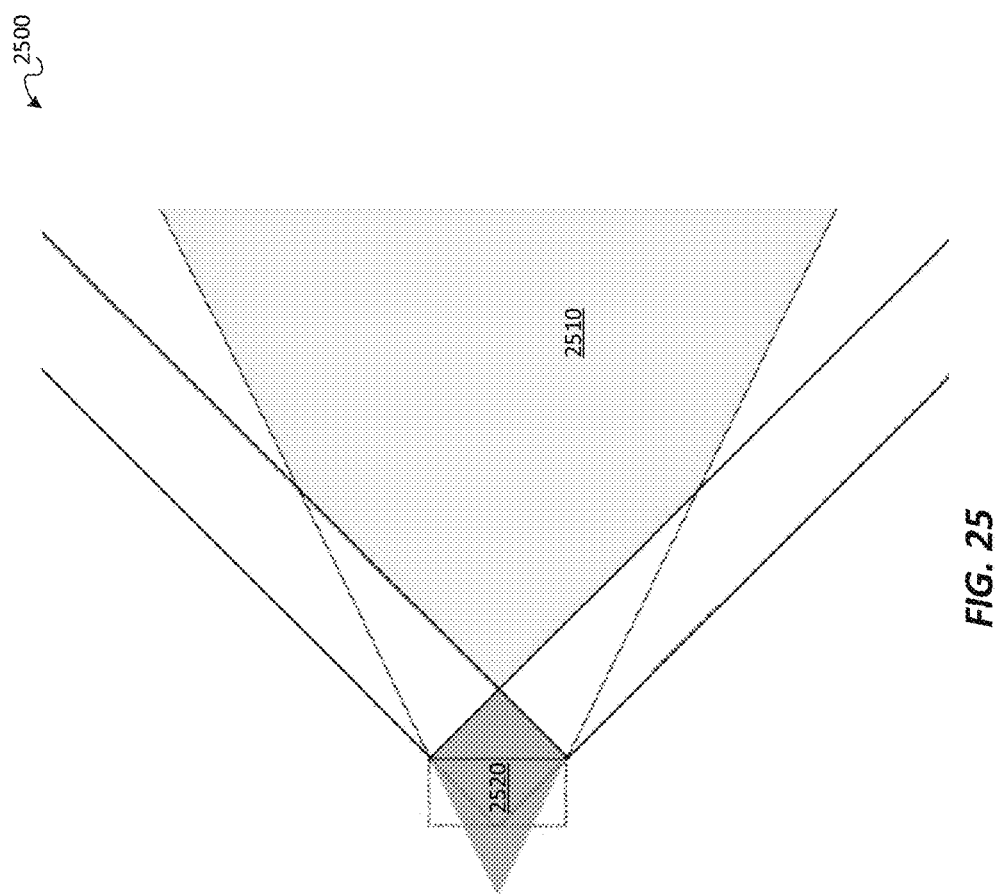

IMMERSIVE CONTENT FRAMING

CROSS-REFERENCE TO RELATED APPLICATIONS

The present application is related to U.S. patent application Ser. No. 15/084,326 for "Capturing Light Field Volume Image and Video Data Using Tiled Light Field Cameras", filed Mar. 29, 2016, the disclosure of which is incorporated herein by reference in its entirety.

The present application is also related to U.S. patent application Ser. No. 15/098,674 for "Light Guided Image Plane Tiled Arrays with Dense Fiber Optic Bundles for Light-Field and High Resolution Image Acquisition", filed Apr. 14, 2016, the disclosure of which is incorporated herein by reference in its entirety.

TECHNICAL FIELD

The present document relates to the generation of virtual views from image data captured with a tiled array of cameras.

BACKGROUND

As better and more immersive display devices are created for providing virtual reality (VR) and augmented reality (AR) environments, it is desirable to be able to present a VR or AR environment in an immersive manner. In a stereo VR environment, a user sees separate views for each eye; also, the user may turn and move his or her head while viewing.

The captured image data may not include image data for all areas around the user. Known systems generally do not have a way to prevent the user from perceiving the edge of the captured image data. Perceiving the edge of the captured image data may detract from the sense of immersion by revealing the limitations of the environment.

SUMMARY

Various embodiments of the described system and method may frame the scene to be viewed in a manner that conceals the edges of the scene. In some embodiments, a virtual view of a scene may be generated through the use of image data received from a tiled array of cameras. The image data may depict a capture volume. The tiled array may be a planar array, a hemispherical array, a semispherical array, or the like. The resulting image data may be displayed for the user within a frame generated by positioning a virtual occluder at least partially in the capture volume.

In one exemplary method, image data may be received from the tiled array of cameras. The image data may depict a capture volume comprising a scene volume in which a scene is located. A viewing volume may be defined. A virtual occluder may be positioned at least partially within the capture volume such that a virtual window of the virtual occluder is between the viewing volume and the scene. A virtual viewpoint within the viewing volume may be selected. A virtual view may be generated to depict the scene from the virtual viewpoint. The virtual occluder may provide many benefits, which may include, but are not limited to, the following:

A heightened sense of immersion in the virtual environment;
Ability to position the virtual viewpoint in an extended, or even infinite, view viewing volume; and
A larger effective field-of-view than the fields-of-view of the cameras of the tiled camera array.

The tiled camera array may have any of a variety of shapes, including but not limited to planar and hemispherical shapes. The size and/or shape of the virtual occluder and/or the virtual window may be determined based on the location of the selected virtual viewpoint. The virtual occluder may extend the viewing volume.

The virtual occluder may have one or more viewpoint-facing surfaces oriented toward the viewing volume; in some embodiments, frame scenery may be mapped onto the viewpoint-facing surfaces. The frame scenery may depict subject matter related to that of the scene captured by the tiled camera array. If desired, various effects, such as lighting and/or object changes, may be applied to the frame scenery in concert with corresponding changes occurring in the scene.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIG. 16 is a chart depicting several exemplary points to be traced, according to one embodiment.

FIG. 25 depicts an arrangement according to one variation of the arrangement of FIG. 24, in which the scene volume has been restricted to increase the size of the viewing volume.

DETAILED DESCRIPTION

Figure 1:
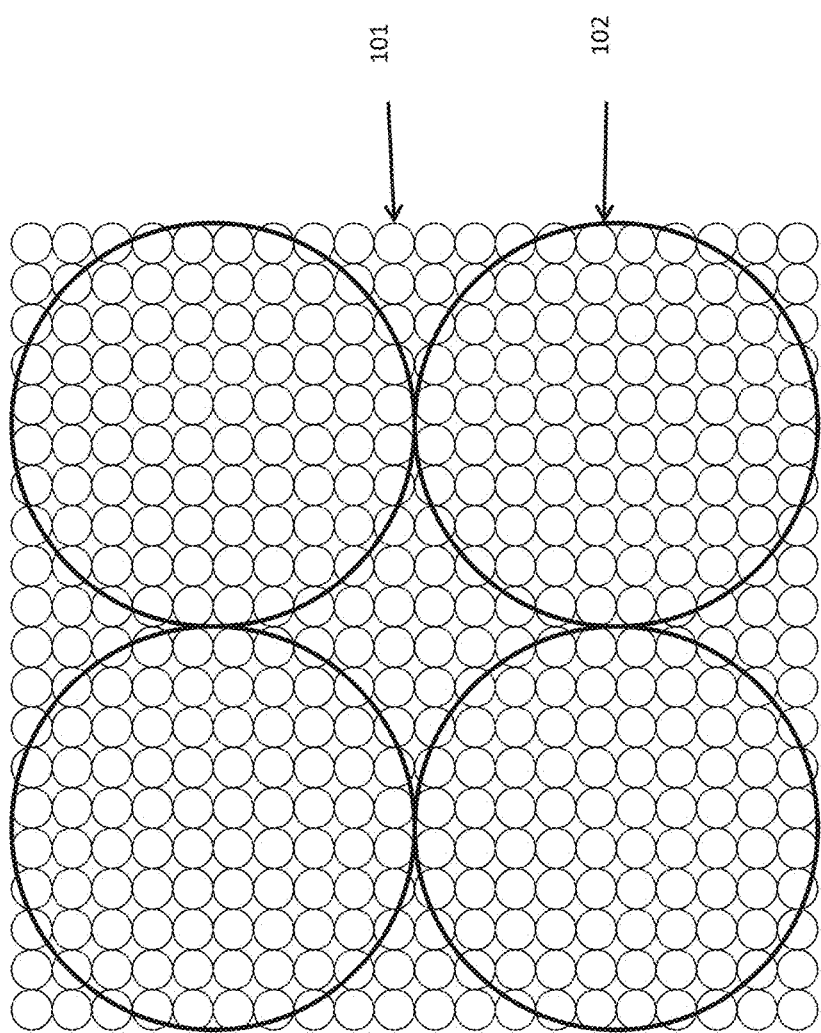
FIG. 1 depicts a portion of a light-field image.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom.

Definitions

For purposes of the description provided herein, the following definitions are used:

Capture surface, or "physical capture surface": a surface defined by a tiled array of light-field cameras, at which light is received from an environment into the light-field cameras, with exemplary capture surfaces having planar, cylindrical, spherical, cubic, and/or other shapes.

Capture volume: the superset (union) of the volume captured by all cameras in a tiled camera array.

Conventional image: an image in which the pixel values are not, collectively or individually, indicative of the angle of incidence at which light is received on the surface of the sensor.

Disk: a region in a light-field image that is illuminated by light passing through a single microlens; may be circular or any other suitable shape.

Disk image: a single image of the aperture stop, viewed through a plenoptic microlens, and captured by a region on the sensor surface.

Environment: a real-world scene to be captured for subsequent visualization or a computer-generated scene.

Hemispherical surface: a surface defined by the exterior of a half-sphere, or the interior of a half-spherical cavity; a hemispherical surface is one type of semispherical surface.

Image: a two-dimensional array of pixel values, or pixels, each specifying a color.

Input device: any device that receives input from a user.

Light-field camera: any camera capable of capturing light-field images.

Light-field data: data indicative of the angle of incidence at which light is received on the surface of the sensor.

Light-field image: an image that contains a representation of light-field data captured at the sensor, which may be a four-dimensional sample representing information carried by ray bundles received by a single light-field camera.

Main lens, or "objective lens": a lens or set of lenses that directs light from a scene toward an image sensor.

Microlens: a small lens, typically one in an array of similar microlenses.

Microlens array: an array of microlenses arranged in a predetermined pattern.

Processor: any processing device capable of processing digital data, which may be a microprocessor, ASIC, FPGA, or other type of processing device.

Scene volume: the volume, which is a subset of a capture volume, of the scene within image data that can be viewed from a volume of viewing points a "Viewing Volume."

Semispherical surface: a surface defined by the exterior of some sectorial portion of a sphere, or the interior of some sectorial portion of a spherical cavity; may be more or less than hemispherical.

Sensor, "photosensor," or "image sensor": a light detector in a camera capable of generating images based on light received by the sensor.

Tiled array or "capture rig": an arrangement of light-field cameras in which the light-field cameras are compactly and/or loosely, evenly and/or unevenly distributed across a capture surface.

Viewing volume: the volume within which a viewpoint can be placed at any point such that tracing back a ray from any point in the Scene Volume intersects the capture plane with an angle to the normal $<=½$ of the capture field-of-view or is blocked by a virtual occluder; i.e. for any point within the viewing volume, the cameras of the capture rig have captured the entire Scene Volume.

Virtual occluder: A synthetic object that is inserted at least partially into a capture volume to occlude one or more regions of the Scene Volume from one or more portions of the Viewing Volume.

Virtual reality: an immersive viewing experience in which images presented to the viewer are based on the location and/or orientation of the viewer's head and/or eyes.

Virtual view: a reconstructed view, typically for display in a virtual reality or augmented reality headset, which may be generated by resampling and/or interpolating data from a captured light-field volume.

Virtual window: a fully-bounded or partially-bounded opening in a Virtual Occluder through which some portion of a Scene Volume may be viewed from some portion of a Viewing Volume.

Virtual viewpoint: the location, within a coordinate system and/or light-field volume, from which a virtual view is generated.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several imaging systems and methods will be described. One skilled in the art will recognize that these various systems and methods can be implemented singly and/or in any suitable combination with one another. Further, although some embodiments below will be described in connection with light-field imaging, many of the configurations and techniques described herein are applicable to conventional imaging as well as light-field imaging. Thus, systems or methods described in connection with light-field imaging may additionally or alternatively be implemented in connection with conventional digital imaging systems. In some cases, the needed modification is as simple as removing the microlens array from the configuration described for light-field imaging to convert the example into a configuration for conventional image capture.

Architecture

Figure 2:
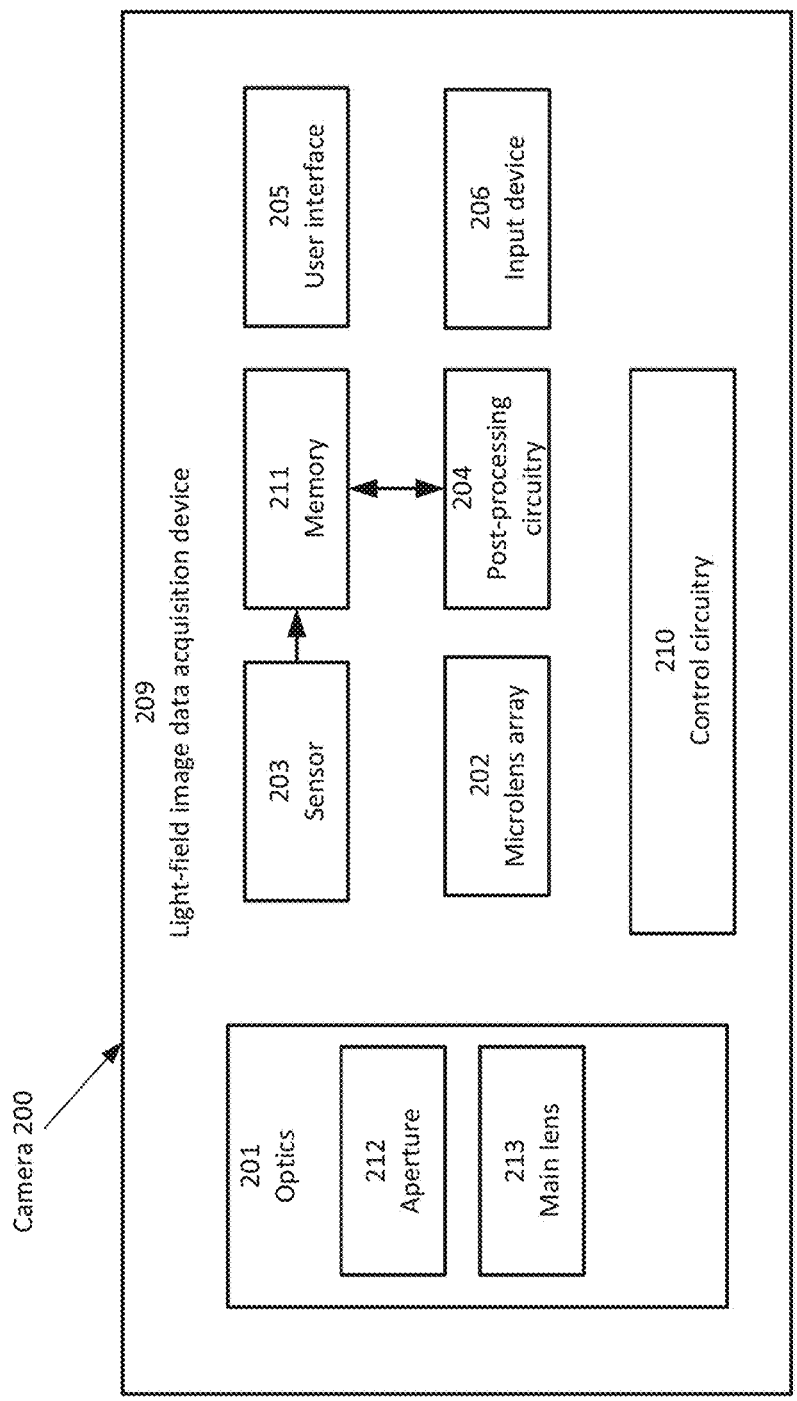
FIG. 2 depicts an example of an architecture for implementing the methods of the present disclosure in a light-field capture device, according to one embodiment.
Figure 3:
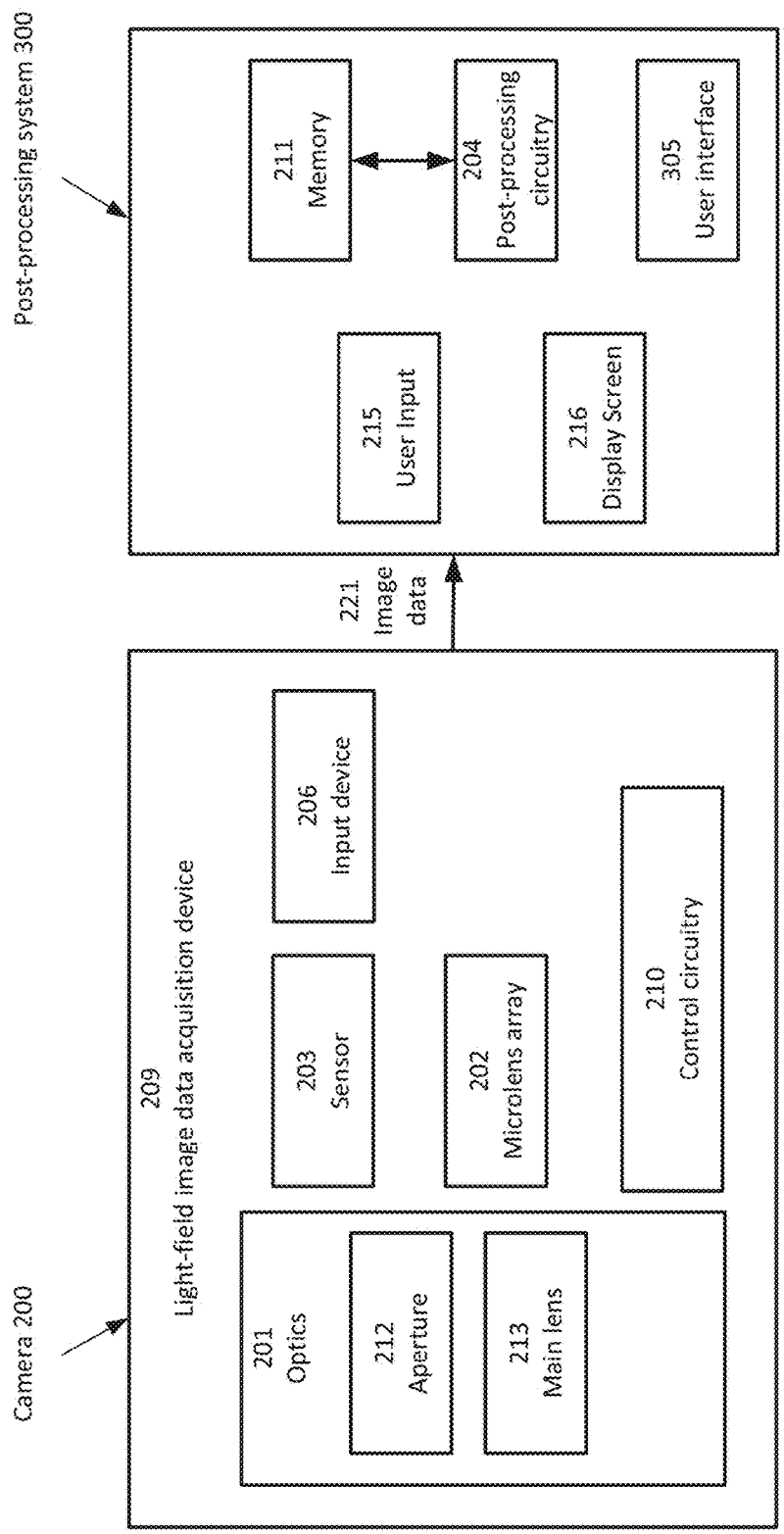
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200. One skilled in the art will further recognize that several of the components shown in the configurations of FIGS. 2 and 3 are optional, and may be omitted or reconfigured.

Figure 4:
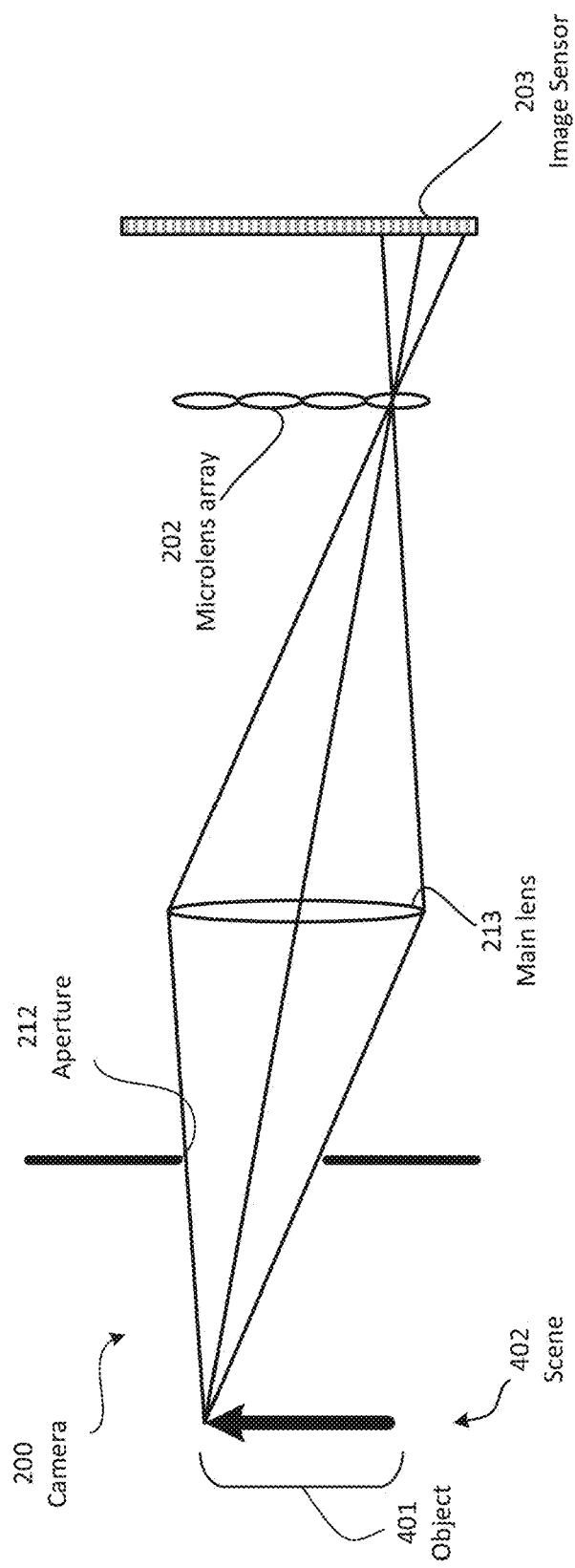
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and image sensor 203) so as to facilitate acquisition, capture, sampling of, recording, and/or obtaining light-field image data via image sensor 203. Referring now also to FIG. 4, there is shown an example of an architecture for a light-field camera, or camera 200, for implementing the method of the present disclosure according to one embodiment. The Figure is not shown to scale. FIG. 4 shows, in conceptual form, the relationship between aperture 212, main lens 213, microlens array 202, and image sensor 203, as such components interact to capture light-field data for one or more objects, represented by an object 401, which may be part of a scene 402.

In at least one embodiment, camera 200 may also include a user interface 205 for allowing a user to provide input for controlling the operation of camera 200 for capturing, acquiring, storing, and/or processing image data. The user interface 205 may receive user input from the user via an input device 206, which may include any one or more user input mechanisms known in the art. For example, the input device 206 may include one or more buttons, switches, touch screens, gesture interpretation devices, pointing devices, and/or the like.

In at least one embodiment, camera 200 may also include control circuitry 210 for facilitating acquisition, sampling, recording, and/or obtaining light-field image data. The control circuitry 210 may, in particular, be used to switch image capture configurations in response to receipt of the corresponding user input. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200.

For example, when camera 200 is in a light-field image capture configuration, camera 200 may store raw light-field image data, as output by image sensor 203, and/or a representation thereof, such as a compressed image data file. In addition, when camera 200 is in a conventional image capture configuration, camera 200 may store conventional image data, which may also be stored as raw, processed, and/or compressed output by the image sensor 203.

In at least one embodiment, captured image data is provided to post-processing circuitry 204. The post-processing circuitry 204 may be disposed in or integrated into light-field image data acquisition device 209, as shown in FIG. 2, or it may be in a separate component external to light-field image data acquisition device 209, as shown in FIG. 3. Such separate component may be local or remote with respect to light-field image data acquisition device 209. Any suitable wired or wireless protocol can be used for transmitting image data 221 to circuitry 204; for example, the camera 200 can transmit image data 221 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input device 215 and/or a display screen 216. If desired, light-field image data may be displayed for the user on the display screen 216.

Overview

Light-field images often include a plurality of projections (which may be circular or of other shapes) of aperture 212 of camera 200, each projection taken from a different vantage point on the camera's focal plane. The light-field image may be captured on image sensor 203. The interposition of microlens array 202 between main lens 213 and image sensor 203 causes images of aperture 212 to be formed on image sensor 203, each microlens in microlens array 202 projecting a small image of main-lens aperture 212 onto image sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing,", filed Feb. 22, 2013 and issued on Sep. 9, 2014 as U.S. Pat. No. 8,831,377, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Tiled Camera Arrays

Virtual reality is intended to be a fully immersive experience for users, often having the goal of creating an experience that is as close as possible to "being there." Users typically don headsets with immersive, wide-angle stereo viewing, multidirectional sound, and onboard sensors that can measure orientation, accelerations, and/or position. Viewers using virtual reality and/or augmented reality headsets may move their heads to point in any direction, move forward and backward, and may move their heads side to side. The point of view from which the user views his or her surroundings may change to match the motion of his or her head.

In some embodiments, a tiled camera array may be used to capture real world content in such a manner that a virtual view can be generated of the captured content, from any position and orientation at which the viewer may hold his or her head. A wide variety of tiled camera arrays are disclosed in U.S. patent application Ser. No. 15/084,326 for "Capturing Light Field Volume Image and Video Data Using Tiled Light Field Cameras", filed Mar. 29, 2016, the disclosure of which is incorporated herein by reference in its entirety. Such tiled camera arrays may include light-field cameras and/or conventional cameras. Image data from the tiled array of cameras may then be used to generate a virtual view, even if the user's viewpoint and/or field-of-view are not the same as that of any one camera of the tiled camera array. This interpolation is also described in the above-referenced U.S. patent application.

Figure 5:
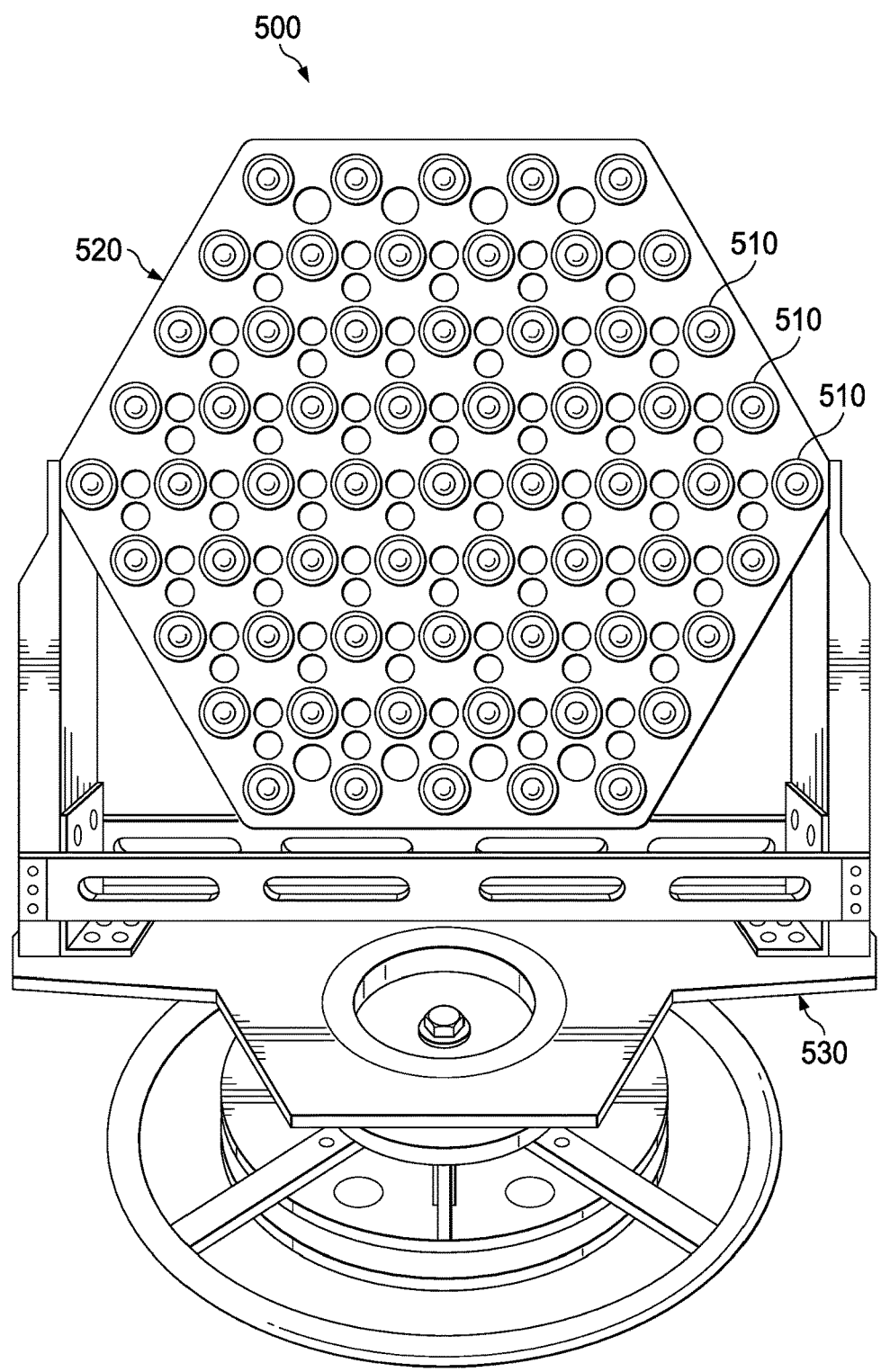
FIG. 5 depicts a tiled camera array with the cameras arranged in a planar array, according to one embodiment.

Referring to FIG. 5, a tiled camera array 500 is depicted, with the cameras 510 arranged in a planar array, according to one embodiment. As shown, the tiled camera array 500 may have a plurality of cameras 510, which may include conventional and/or light-field cameras. The cameras 510 may be arranged in a hexagonal pattern as shown. The cameras 510 may be said to be in a planar array because the cameras 510 are all positioned on a common plane.

In the example of FIG. 5, the cameras 510 may be secured to a frame 520, which may also have a hexagonal shape. The frame 520 may be secured to a base 530. The base 530 may optionally be mounted on a rotatable coupling that permits the base 530 to swivel about a vertical axis, allowing the fields-of-view of the cameras 510 to sweep through a horizontal range. Optionally, the frame 520 and the base 530 may be connected by another rotatable coupling so that the frame 520 can rotate about a horizontal axis, allowing the fields-of-view of the cameras 510 to sweep through a vertical range. Thus, the frame 520 may optionally be rotated in pitch and/or yaw.

Figure 6:
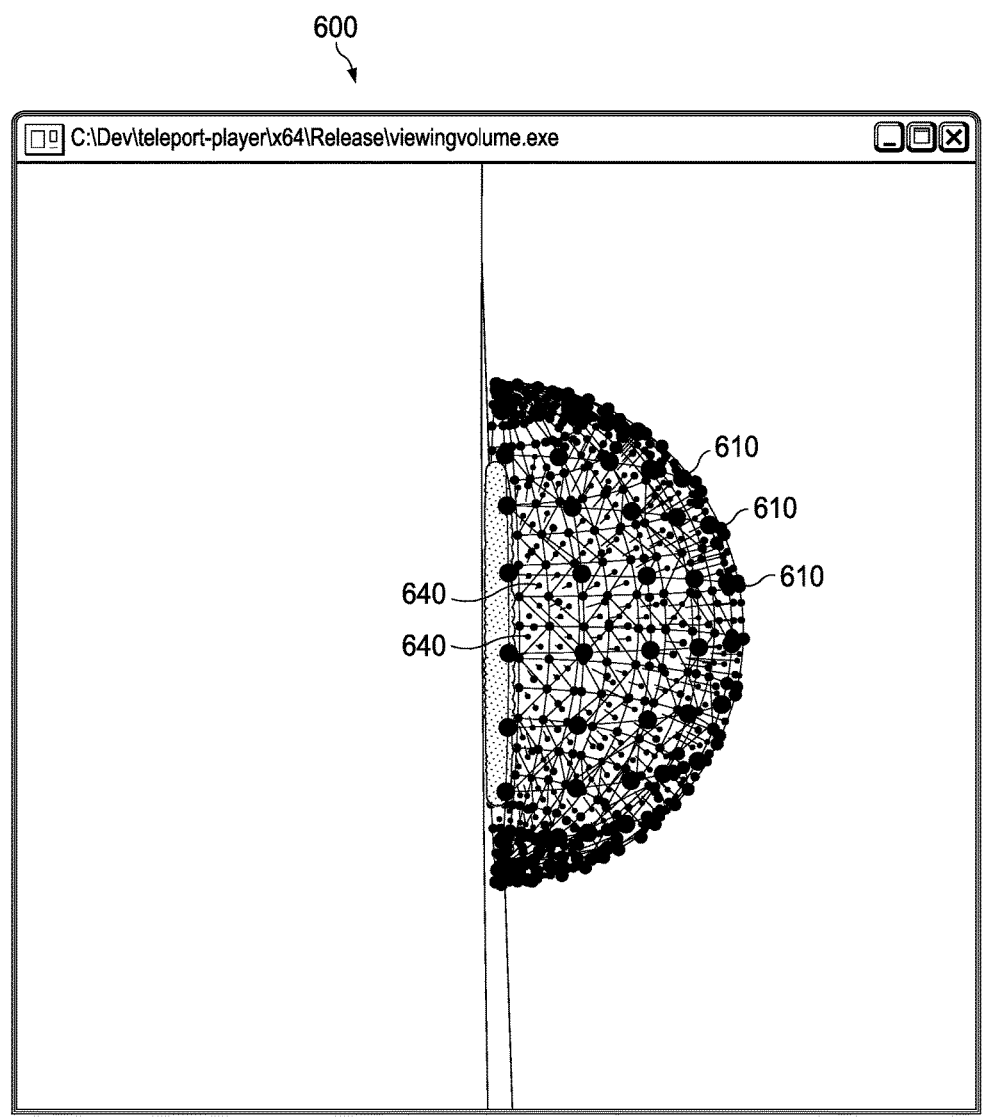
FIG. 6 depicts a tiled camera array according to a computer simulation, with the cameras arranged in a hemispherical array, according to one embodiment.

Referring to FIG. 6, a tiled camera array 600 is depicted, according to a computer simulation, with the cameras 610 arranged in a hemispherical array, according to one embodiment. The tiled camera array 600 may also have a plurality of cameras 610; however, the cameras 610 may be arranged in a semispherical pattern as shown. The cameras 610 may be oriented generally toward the center of the semispherical shape, as indicated by the arrows 640 illustrating the orientation of the center of the field-of-view of each of the cameras 610. The cameras 610 of the tiled camera array 600 may be mounted to a frame with a semispherical shape, which may optionally be rotatable in pitch and/or yaw as described in connection with the tiled camera array 500.

The tiled camera array 600 may provide a wider range of viewing angles than the tiled camera array 500. However, the tiled camera array 600 may be designed to capture a relatively smaller scene.

Notably, several modifications of the tiled camera array 500 and/or the tiled camera array 600 may be made. For example, the cameras 510 of the tiled camera array 500 may be arranged in a wide variety of planar shapes and sizes. The cameras 510 may define a circular, square, oval, or other pattern, or may even be arranged in an irregular shape. The cameras 610 of the tiled camera array 600 may be arranged in a three-dimensional ellipsoidal or oval shape, or in a generally spherical shape that includes more or less than half of the sphere. In some embodiments, the cameras 610 may be arranged in a semispherical pattern that sweeps across an angle of 90°, rather than 180°, as in FIG. 6. Those of skill in the art will recognize that numerous other tiled camera arrays may be generated based on these and other modifications of the tiled camera array 500 and the tiled camera array 600.

Such tiled camera arrays may be used to capture a capture volume, as defined above. The capture volume may be viewed, as part of a viewing experience such as a virtual reality or augmented reality experience, from one or more virtual viewpoints that are generated based on the image data of the capture volume. The virtual viewpoint may or may not be aligned with the actual viewpoint of one of the cameras of the tiled array; rather, if needed, the virtual viewpoint may be generated via extrapolation of the image data captured from multiple cameras of the tiled camera array, as mentioned in the above-referenced U.S. patent application.

A viewing volume may be defined, from which the scene captured in the capture volume is to be viewed. The virtual viewpoint may be positionable at any location within the viewing volume. The scene volume may generally be the portion of the scene that is visible from within the viewing volume. More precise definitions of these terms are provided in the "Definitions" section above.

Immersive Content Framing

As mentioned previously, it would be advantageous to provide a viewing experience that is as immersive as possible. Thus, it may be helpful to hide the edges of the scene volume from the viewer so that he or she has the impression of viewing only a small portion of a larger, continuous environment. Content framing may be applied to a scene to help enhance the viewing experience. The viewer may view the scene through the frame, which may provide for uniquely immersive viewing.

Figure 7:
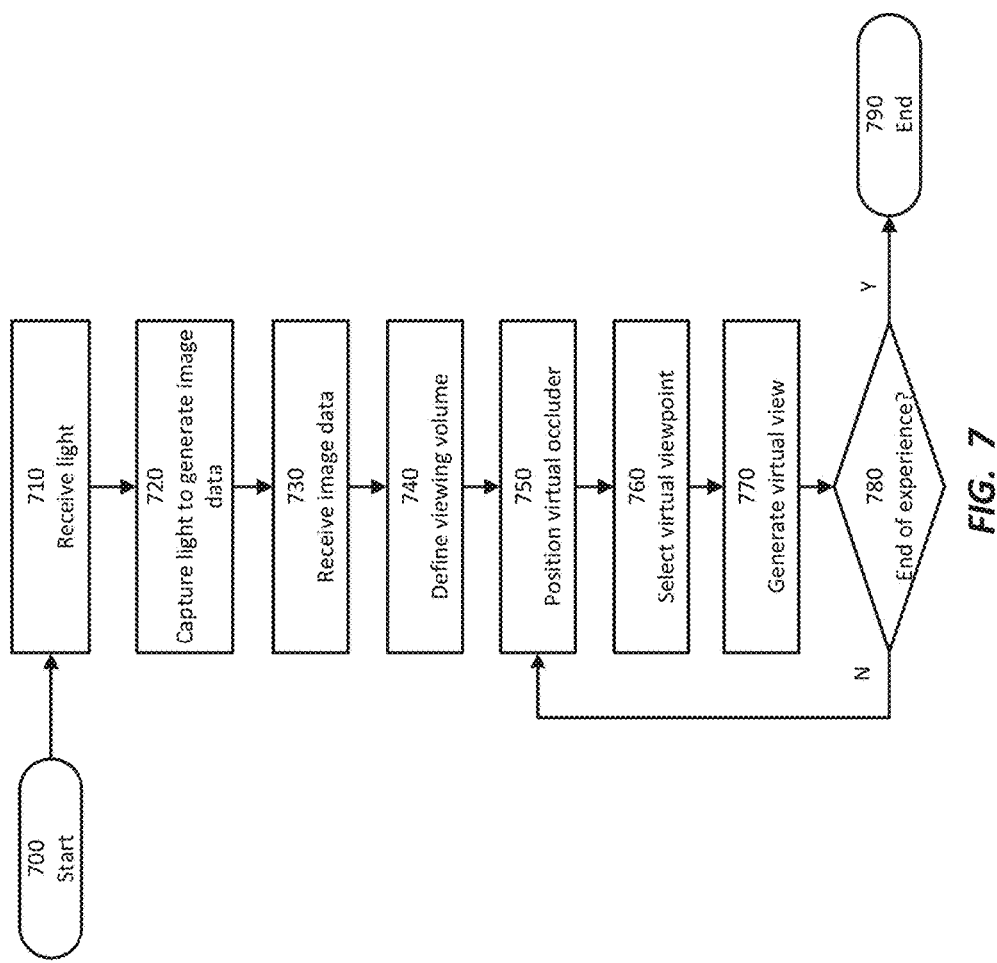
FIG. 7 depicts a method for generating one or more virtual views as part of an experience, according to one embodiment.

FIG. 7 depicts a method for generating one or more virtual views as part of an experience, according to one embodiment. The method may be performed, for example, with image data captured with a tiled camera array such as the tiled camera array 500 of FIG. 5, the tiled camera array of FIG. 6, or a different tiled camera array.

The method may start 700 with step 710, in which light is received, for example, by a tiled camera array as described previously. In step 720, the light may be captured by the tiled camera array. In step 730, image data based on the captured light may be received. Step 730 may include receipt of the image data in one or more cameras, which may be conventional and/or light-field cameras like the camera 200 of FIG. 2. Additionally or alternatively, step 730 may include receipt of the image data in a separate system such as the post-processing system 300 of FIG. 3. The post-processing system 300 may have post-processing circuitry 204, memory 211, a user input device 215, a display screen 216, and a user interface 305.

The remaining steps of the method may be performed by a computing device connected to a virtual reality or augmented viewing device, such as a virtual reality headset. This may be the post-processing system 300 or a different computing system.

In step 740, a viewing volume may be defined. The viewing volume may optionally be defined based on the desired range of motion of the viewer's head. More specifically, the viewing volume may be defined to encompass the range of viewpoints from which the viewer may position his or her head to view the scene.

In step 750, a virtual occluder may be positioned at least partially within the capture volume. The virtual occluder may include one or more walls that are opaque to the user. The one or more walls may be textured with one or more images, for example, matched to the theme of the image data. The virtual occluder may have a virtual window that is not occluded. The virtual window may be fully bounded by the wall(s) of the virtual occluder, or may be a notch, alcove, or other void that intersects the edge(s) of the wall(s). In step 750, the virtual occluder may be positioned such that the virtual window is between the viewing volume and the scene to be viewed.

In step 760, a virtual viewpoint within the viewing volume may be selected. This may be done, for example, by receiving position and/or orientation data indicative of the disposition of the viewer's head (for example, from one or more sensors in the virtual reality headset), and using the position and/or orientation data to determine the corresponding location of the virtual viewpoint within the viewing volume.

In step 770, a virtual view may be generated, depicting the scene as viewed from the virtual viewpoint. As indicated previously, this may involve extrapolation and/or combination of image data captured from different cameras of a tiled camera array. Generation of virtual views is described in more detail in U.S. patent application Ser. No. 15/084,326 for "Capturing Light Field Volume Image and Video Data Using Tiled Light Field Cameras", filed 29 Mar. 2016. The virtual view may be shown to the viewer.

In query 780, a determination may be made as to whether the viewing experience has ended. If query 780 is answered in the negative, the method may return to the step 750. The virtual occluder may be repositioned if needed in step 750, and a new virtual viewpoint may be selected in step 760, based on the updated disposition of the viewer's head. In step 770, a new virtual view may be shown to the viewer, from the viewpoint of the new virtual viewpoint, and with the virtual occluder in its new position. The query 780 may be repeated along with step 750, step 760, and step 770 until query 780 is answered in the affirmative. The method may then end 790, representing the end of the viewing experience.

Various aspects of the method will be further described and exemplified in connection with the remaining drawings. In order to facilitate understanding of the concepts embodied in the examples, virtual view basics and a virtual view sampling algorithm will be set forth.

Virtual View Basics

Virtual view basics will be set forth herein to facilitate understanding of the generation of virtual views. Tiled camera array ("capture rig") design and scene content may impact the viewing experience, i.e., size and shape of the viewing volume. In the following discussion, the following assumptions may apply:

Width, height, and shape of the capture surface—1 m by 1 m square

Field-of-View (FoV) of capture cameras—90°

Orientation of capture cameras—tangentially outward from the capture surface

Assumes constant pixel quality across camera FoV

Assumes any point in the scene is visible if at least one camera sees it

Assumes infinite number of cameras across capture surface

Tracing Points

A view point is a point for which it is desirable to generate a view in order to view points within the scene. Looking at specific viewpoints behind the capture plane (or capture surface) and certain points within the scene, the listing in FIG. 16 may indicate which points can be seen from which views.

Referring to FIG. 16, a chart 1600 illustrates several exemplary points to be traced, according to one embodiment. The positions of the points are shown on FIG. 24. The chart 1600 indicates which points can be seen from which views.

Figure 24:
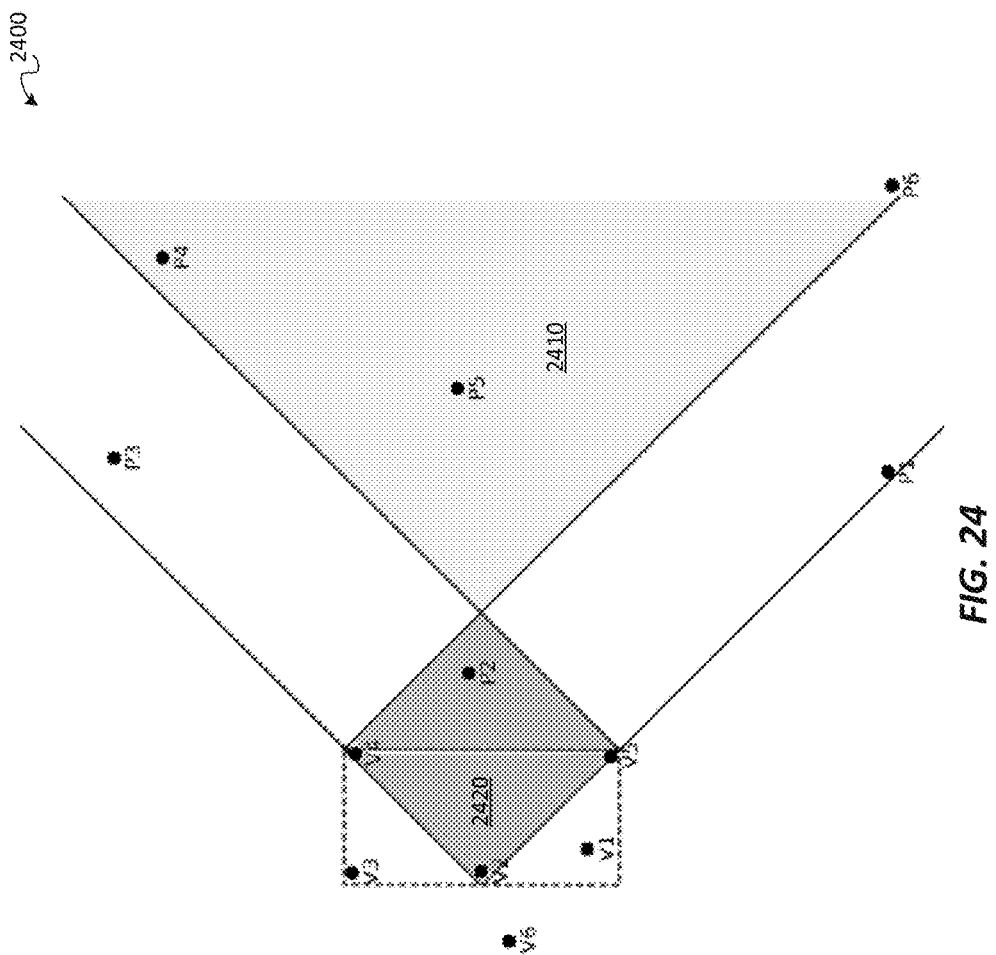
FIG. 24 depicts an arrangement of the points set forth in the chart of FIG. 16. The points may be distributed as shown.

Referring to FIG. 24, an arrangement 2400 illustrates the points set forth in the chart 1600 of FIG. 16. The points may be distributed as shown. The fact that a point in the scene has been captured by a single camera does not necessarily mean that it can be viewed from a large region. In general, it may be desirable to maximize both the size of the region from which the scene can be viewed, and the volume that can be viewed.

Choosing Scene Volume and Viewing Volume

The capture volume, scene volume, and viewing volume were defined previously in the "Definitions" section. Viewing volume and scene volume may both be free variables that are dependent on each other. Thus, there are multiple possible viewing volumes and/or scene volumes. In some examples, a viewing volume may exist in front of the capture surface, but this may be ignored for simplicity in the descriptions of the remaining drawings. The viewing volume and scene volume are not necessarily constants for any given capture rig. In general, one can be constrained to maximize the other. The following are some of the many valid combinations of viewing volume and scene volume suitable for the exemplary points of the chart 1600 of FIG. 16 and the arrangement 2400 of FIG. 24:

Larger VV:
VV: V1-V6
SV: P5
Larger SV:
VV: V2
SV: P1-P6
Balanced:
VV: V2, V4, V5
SV: P4, P5, P6

In arrangement 2400, a scene volume 2410 (yellow) and a viewing volume 2420 (green) have been defined. The yellow and green colors are used in FIG. 24 and other arrangements in the drawings to indicate a scene volume and a capture volume, respectively. The scene volume 2410 may continue outward toward infinity.

Limiting the Content

In some embodiments, the scene volume may be restricted to increase the size of the viewing volume. Conversely, a larger scene volume may provide a relatively smaller viewing volume.

Referring to FIG. 25, an arrangement 2500 depicts a variation of the arrangement 2400 of FIG. 24, in which the scene volume 2510 has been restricted to increase the size of the viewing volume 2520. The field-of-view in FIG. 25 may thus be restricted from 90° to 60°.

Virtual View Sampling Algorithm

As described herein, a virtual view sampling algorithm may be used to determine whether particular points are within the viewing volume.

Setup

The following are steps that may be used to prepare for execution of the algorithm:

1. captureSurface—Create a triangle mesh of the capture surface and compute normals indicating the directions in which the cameras are to be facing (relatively easy to do in modern 3D modeling software).
2. cameraFoV—Choose the field-of-view (FoV) degrees and type (rectangular/circular) for the cameras on the capture surface. In one embodiment, 90° square cameras can be used.
3. virtualOccluders—Create a triangle mesh of any Virtual Occluders and place them accordingly.
4. scenePoints—Create a sampling of points in the Scene Volume (i.e. the points that are to be visible from all the points within the Viewing Volume).
5. testPoints—Create a sampling of points in a volume around the capture surface where the Viewing Volume is likely to be. Each of these points will be tested to determine whether they are actually within the Viewing Volume.

Calculate Points within Viewing Volume

The following pseudocode describes a method for calculating a viewing volume from a fixed scene volume, according to one embodiment. The pseudocode may begin with a fixed set of points within a scene, and then test potential viewing volume points:

High Level:

```
// For every test point, draw a ray from every point in the scene to it
// Then check if every ray was either captured or occluded
For every point viewP : testVVPoints
    testSuccess=true
    For every point sceneP : scenePoints
        sceneToViewRay = TestRay(sceneP, viewP)
        testSuccess = testSuccess & TestSVVV(sceneToViewRay)
    IF testSuccess
        Add viewP to VV
scenePoints - Create a sampling of points in your Scene Volume(i.e. the
points you want visible from all the points within your VV).
testVVPoints - Create a sampling of points in a volume around your
capture surface where you think that the VV might be. We will test each
of these points to see if they are actually within the VV.
```

Calculate Points within Scene Volume

The following pseudocode describes a method for calculating a scene volume from a fixed viewing volume, according to one embodiment. The pseudocode may begin with a fixed set of points within a viewing volume, and then test potential scene volume points:

High Level:

```
// For every test point, draw a ray from every point in the scene to it
// Then check if every ray was either captured or occluded
For every point sceneP : testSVPoints
    testSuccess=true
    For every point viewP : vvPoints
        sceneToViewRay = Ray(sceneP, viewP)
        testSuccess = testSuccess & TestSVVV(sceneToViewRay)
    IF testSuccess
        Add sceneP to SV
testSVPoints - Create a sampling of points in your Capture Volume that
you think might be in your Scene Volume
vvPoints - Create a sampling of points in your View Volume.
```

Test if Ray was Captured/Occluded:

```
TestRay(Ray sceneToViewRay)
    // Return successful if the ray of light was "blocked" by an occluder
    IF CheckForFirstIntersection(testRay, virtualOccluders)
        return true
    // Check for intersections of the test ray with the capture surface
    // NOTE: We extend the ray forward s.t. the ray can be captured by
    the capture surface past viewP
    *Extend testRay to +infinity
    intersectionPoint = CheckForFirstIntersection(testRay,
    captureSurface)
    // At the intersection point, check if the camera saw the ray
    camera = GetCameraAtIntersection(captureSurface, intersectionPoint,
cameraFoV)
    IF camera saw sceneToViewRay
        return true
// Return unsuccessful if no camera saw testRay
return false
```

Notes Regarding Pseudocode

Regarding CheckForFirstIntersection(testRay, virtualOccluder) and CheckForFirstIntersection(testRay, captureSurface), when the virtualOccluder and capture surface have been meshed into triangles, it may become relatively easy to calculate intersections of a ray. This may be done, in one embodiment, by looping over every three-dimensional triangle in the mesh and testing to determine whether the ray intersects it. In this regard, it may be advantageous to use meshes for the capture surface and/or the virtual occluder. Only the first intersection may matter since the first intersection will block the ray from being captured by a other intersection with the captureSurface.

Regarding camera=GetCameraAtIntersection(captureSurface, intersectionP, cameraFoV), the direction where the camera should be facing may be encoded into the normals at every vertex within the captureSurface mesh. Barycentric interpolation at the point of intersection may yield the exact normal desired. The camera may be constructed with the normal and cameraFoV.

Exemplary Configurations

Referring now to FIGS. 8 through 18, there are shown examples illustrating the above-described concepts and methods.

Capture Volume with Planar Capture Surface and No Virtual Occluder

Figure 8:
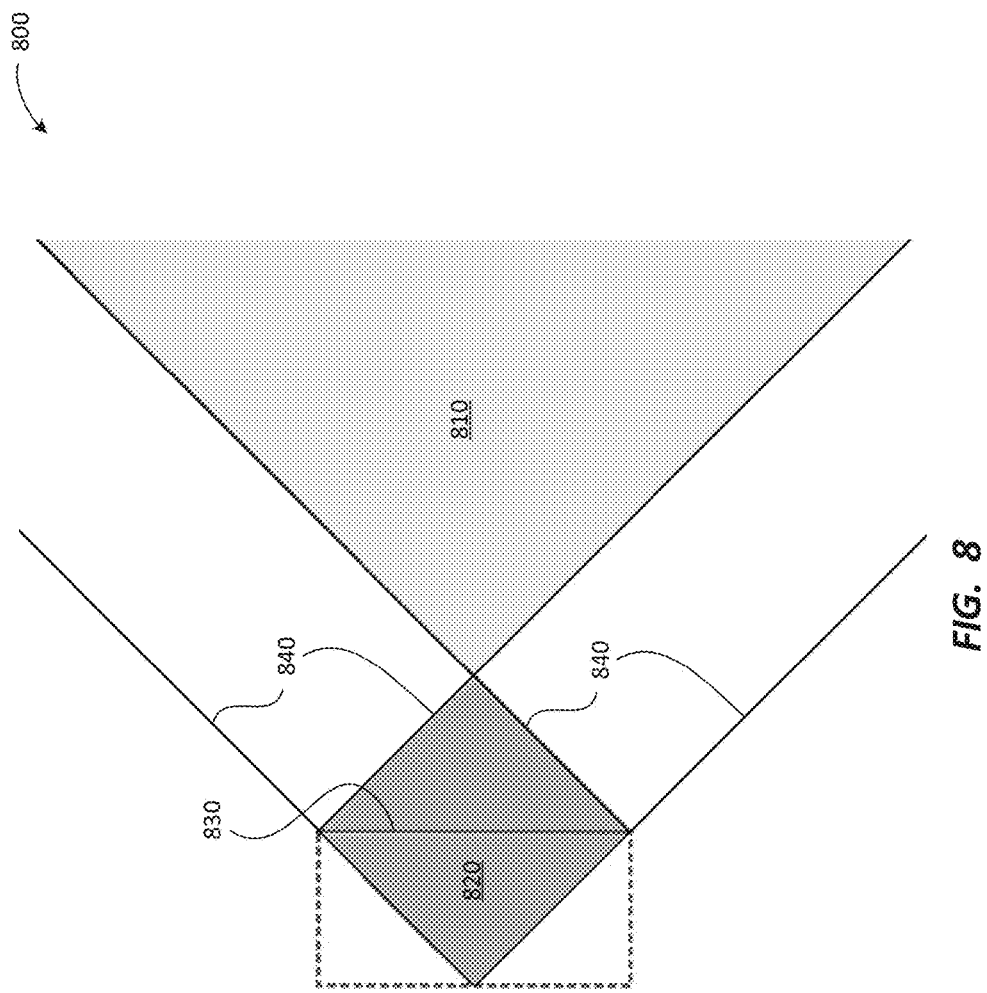
FIG. 8 is an arrangement depicting a portion of a capture volume, according to one embodiment.

Referring to FIG. 8, example arrangement 800 depicts a portion of a capture volume, according to one embodiment. In arrangement 800, a scene volume 810 (yellow) and a viewing volume 820 (green) have been defined. The yellow and green colors will be used throughout FIGS. 8 through 18 to indicate a scene volume and a capture volume, respectively.

A capture surface 830 may be adjacent to the viewing volume 820, and may bisect the viewing volume 820 in arrangement 800. The capture surface 830 may be the plane at which a planar tiled camera array was positioned in order to capture the image data that will be viewed in a viewing experience, for which the scene volume 810 and the viewing volume 820 have been defined. The fields-of-view 840 of the cameras (such as cameras 510 of the tiled camera array 500 of FIG. 5) at the edges of the capture surface 830 are shown to indicate the extents of the capture volume.

The fields-of-view 840 illustrate how, from locations at the edges of the viewing volume 820, a viewer may see beyond the edges of the scene volume 810. Thus, the viewer may perceive that only a limited scene has been captured. This may limit the viewer's ability to feel immersed in the captured environment. Thus, it may be helpful to use a virtual occluder. The use of a virtual occluder may also optimize the size of the viewing volume 820 and/or the scene volume 810.

Capture Volume with Planar Capture Surface and Virtual Occluder

Figure 9:
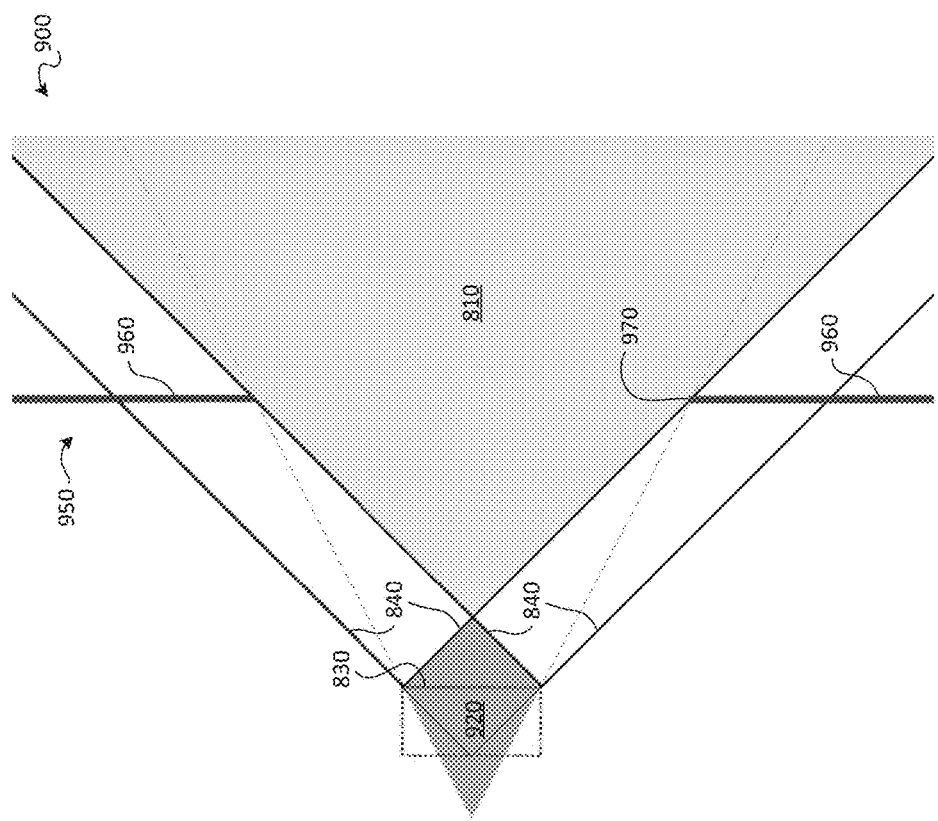
FIG. 9 is an arrangement depicting a portion of the capture volume of FIG. 8, with the addition of a virtual occluder, according to one embodiment.

Referring to FIG. 9, an arrangement 900 depicts a portion of the capture volume of FIG. 8, with the addition of a virtual occluder 950, according to one embodiment. The virtual occluder 950 may have walls 960 in which a virtual window 970 is defined. The virtual window 970 may have any of a wide variety of shapes, including but not limited to circular, oval, ellipsoidal, polygonal, rectangular, and/or shapes consisting of curved and straight edges.

The virtual window 970 may be positioned between the viewing volume 920 and the scene volume 810 so that the scene volume 810 is viewed from the viewing volume 920 through the virtual window 970. Thus, the edges of the scene volume 810 may not be visible to the viewer. Specifically, the volume viewable within the fields-of-view 840 may be obstructed by the walls 960 of the virtual occluder 950 to prevent the viewer from perceiving the edges of the scene volume 810.

Further, the viewing volume 920 may have a size and/or shape different from those of the viewing volume 820 of FIG. 8. Specifically, by comparison with FIG. 8, the scene volume 810 is unchanged, but the viewing volume 820 has been elongated to define a viewing volume 920 with added depth. The virtual occluder 950 may thus enable the scene volume 810 to be viewed from a larger range of viewpoints, without revealing the edges of the scene volume 810.

Figure 19:
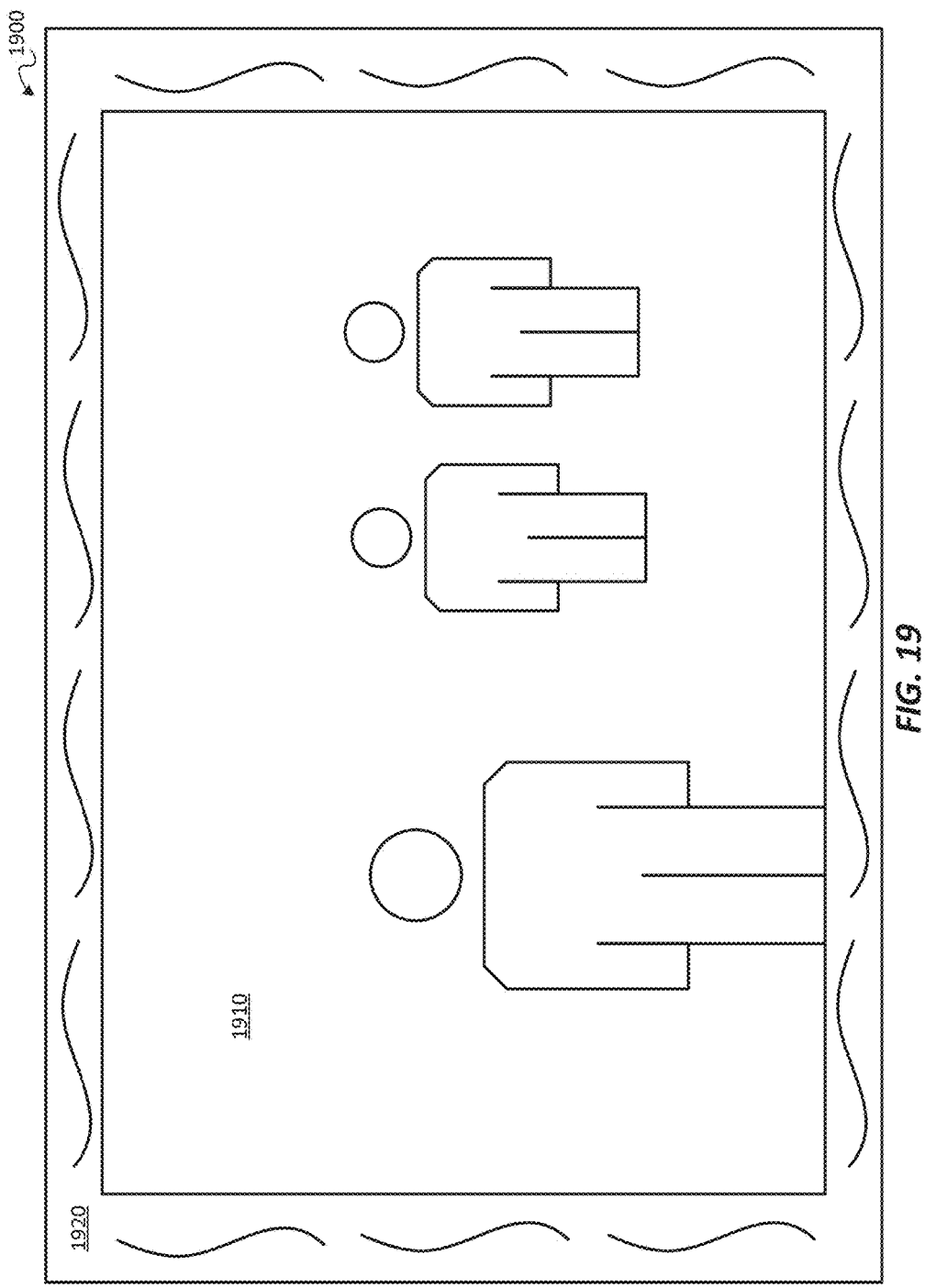
FIG. 19 is a virtual view depicting a scene displayed within a frame, according to one embodiment.

The virtual occluder 950 may be positioned in at least a portion of the capture volume during post-processing. In some embodiments, the virtual occluder 950 may even be placed in real-time as the virtual view is generated. A virtual occluder of this type may simulate a stage, frame, doorway, or other structure through which the scene volume 810 is viewed. One example of a virtual view generated with such an arrangement is shown in FIG. 19.

In some embodiments, the design of a virtual occluder may be integrated with the design of the capture rig. Thus, the scene volume and/or the viewing volume may be optimized through proper selection of the parameters of the virtual occluder and the capture rig. In this manner, the viewing experience may be enhanced.

Cooperative Capture Rig and Virtual Occluder Design

Figure 10:
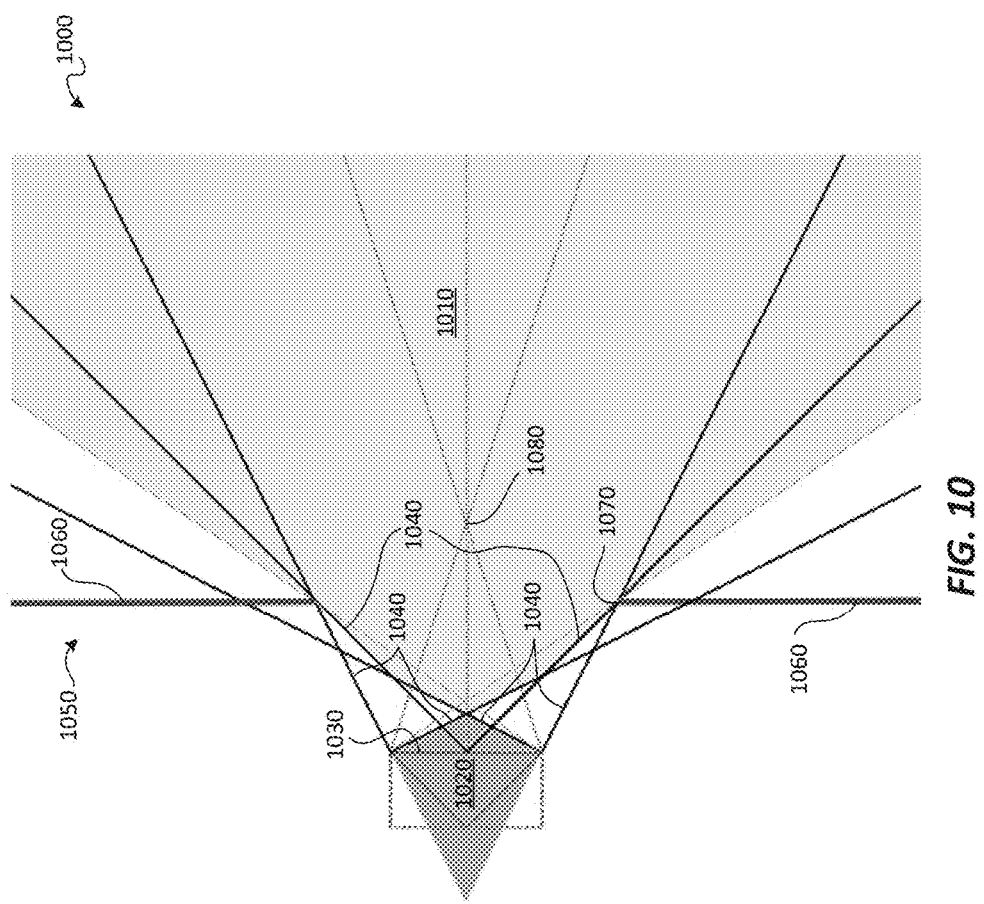
FIG. 10 is an arrangement depicting a portion of a capture volume, with the addition of a virtual occluder, according to another embodiment.

Referring to FIG. 10, an arrangement 1000 depicts a portion of a capture volume, with the addition of a virtual occluder 1050, according to another embodiment. A scene volume 1010 may be viewed from a viewing volume 1020. The image data may be captured through the use of a capture rig with a planar tiled camera array in which the cameras are arranged in a square array with an area of one square meter. This square array is represented by a capture surface 1030. The viewing volume 1020 may also have a height and a depth of one meter. The virtual occluder 1050 may have walls 1060 that define a virtual window 1070 with a square shape that is two meters to a side. The virtual window 1070 may be positioned one meter from the capture surface 1030. Thus, the design of the virtual occluder 1050 may be selected in cooperation with that of the capture rig to obtain the desired scene volume 1010 and viewing volume 1020. The dimensions provided above are exemplary, and are merely provided to facilitate the manner in which geometry may be used to determine the relative size and shape of a capture volume, a viewing volume, and/or a scene volume.

Further, if desired, the cameras on the capture surface 1030 may be oriented such that the centers of their fields-of-view 1040 intersect at a common focal point 1080. Thus, the one or more cameras at the center of the capture surface 1030 may be facing perpendicular to the capture surface 1030, while cameras that are not at the center of the capture surface 1030 may have tilt angles that increase toward the edges of the capture surface 1030. In this manner, the viewing volume 1020 may be further optimized, and the center of the scene volume 1010 may remain proximate the center of each virtual view generated within the viewing volume 1020. Additionally or alternatively, the fields-of-view of the cameras of the tiled camera array may be increased.

Sealed Virtual Occluder

Figure 11:
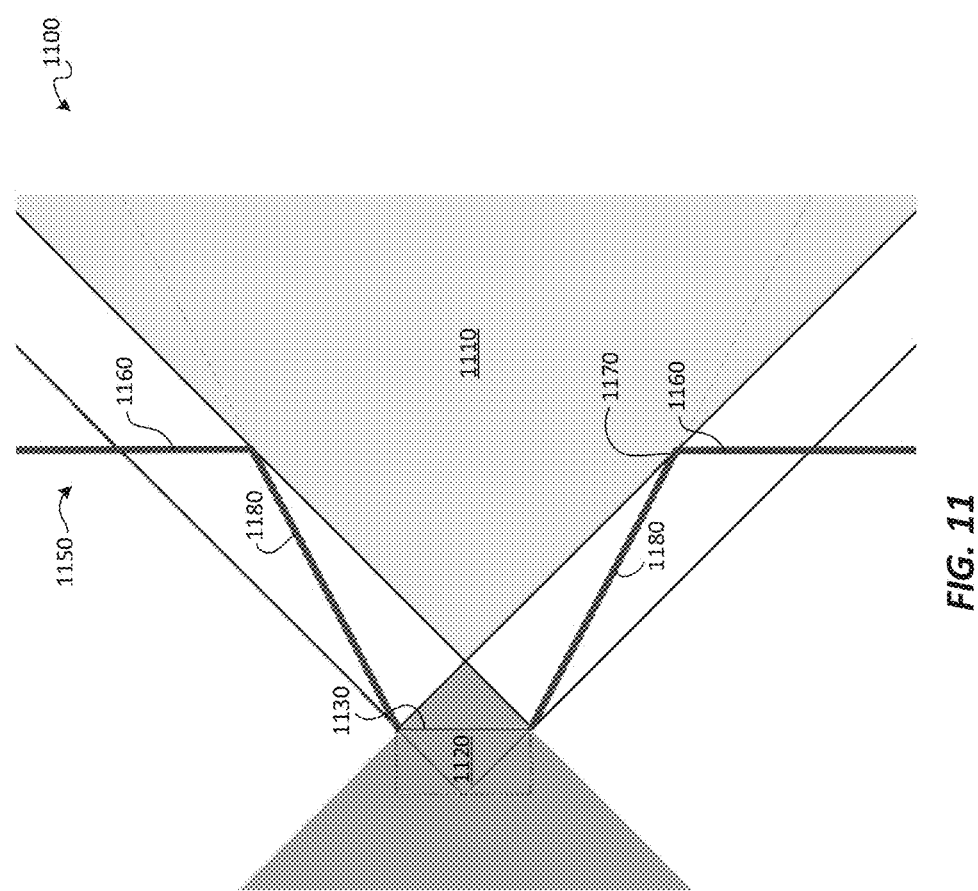
FIG. 11 is an arrangement depicting a portion of a capture volume, with the addition of a virtual occluder, according to another embodiment.

Referring to FIG. 11, an arrangement 1100 depicts a portion of a capture volume, with the addition of a virtual occluder 1150, according to another embodiment. A scene volume 1110 may be viewed from a viewing volume 1120. The image data may be captured through the use of a capture rig with a planar tiled camera array represented by a capture surface 1130. The virtual occluder 1150 may have walls 1160 defining a virtual window 1170, and extensions 1180 that extend the virtual occluder 1150 to the edges of the capture surface 1130.

By extending the virtual occluder 1150 to the capture surface 1130 through the use of the extensions 1180, a virtual seal may be formed around the capture surface 1130. This seal may effectively deepen the virtual window 1170. Consequently, every ray of light passing through the capture surface 1130 from the scene volume 1110, which would not be occluded by the virtual occluder 1150, may be received in the viewing volume 1120.

Figure 20:
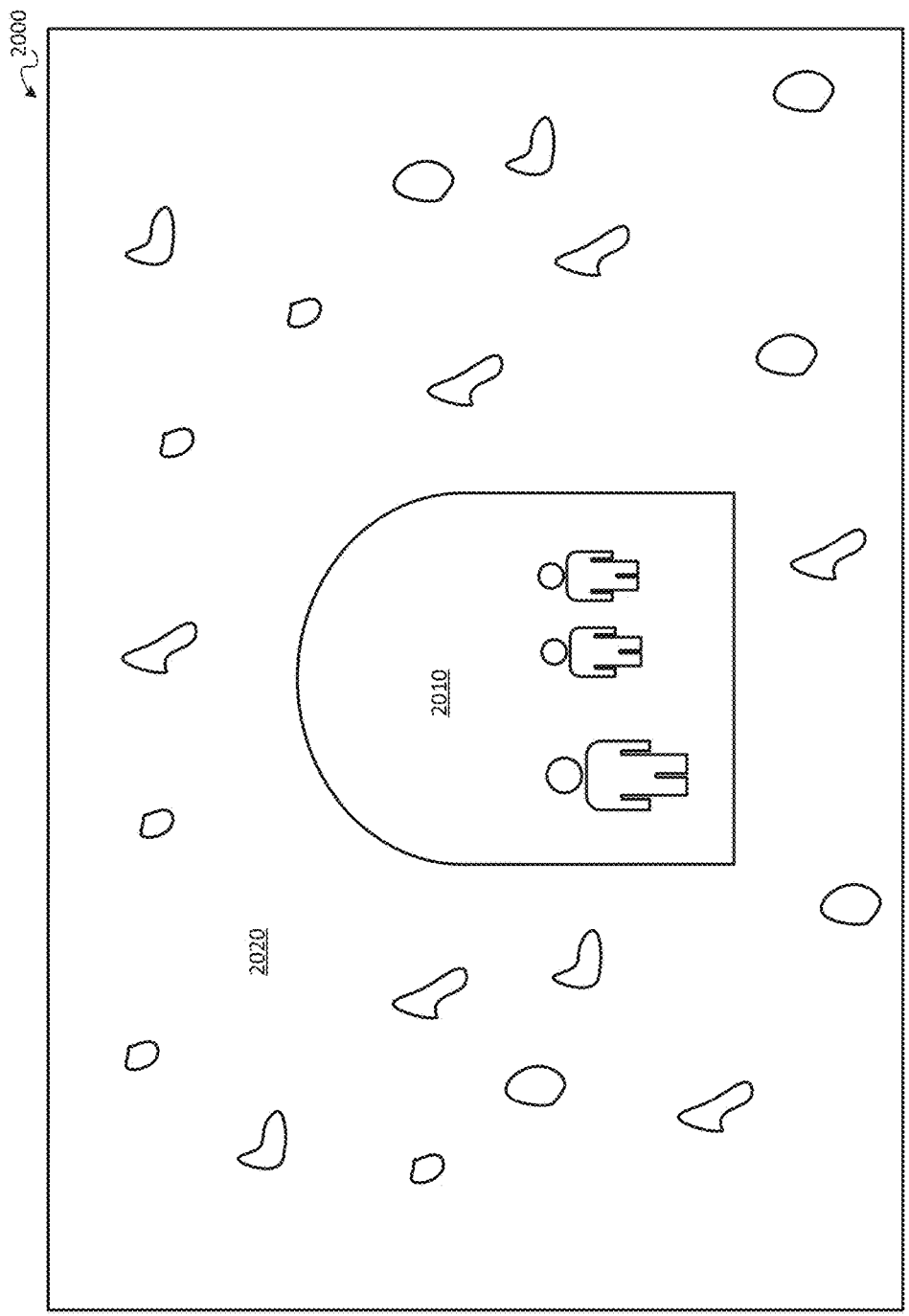
FIG. 20 is a virtual view depicting a scene displayed within the interior of a cavity that opens into a scene, according to one embodiment.

This can be compared to capturing all the rays of light entering a dark room with a single window. Since that single window is the only light source and every ray of light passing through it has been captured, the viewer can look through the window from any point within the room. Thus, the viewing volume 1120 may be extended as illustrated in FIG. 11, even to an infinite distance from the capture surface 1130. A virtual occluder of this type may simulate the view from within a windowed room, through a tunnel, or the like. One example of a virtual view generated with such an arrangement is shown in FIG. 20.

An infinite viewing volume may not be needed. Accordingly, in some embodiments, the extensions 1180 may be modified such that they do not extend to the capture surface 1130, thereby providing an enlarged, but not infinite, viewing volume 1120.

Multiple Virtual Occluders

Figure 12:
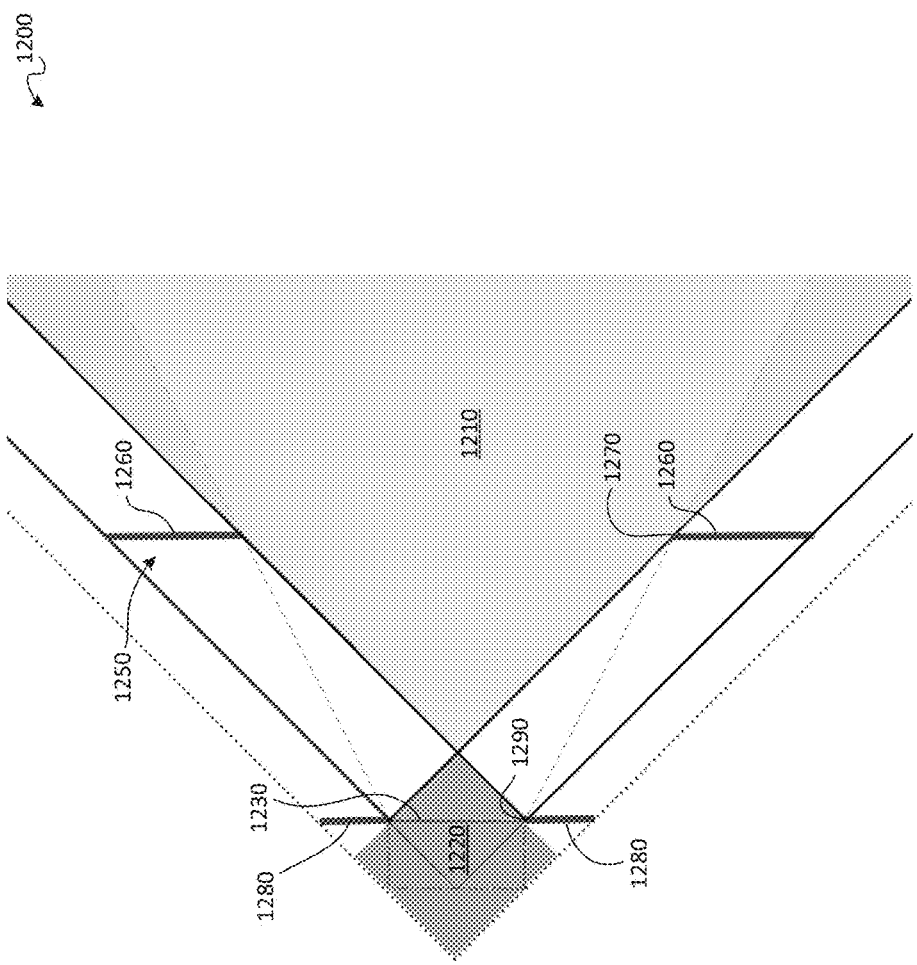
FIG. 12 is an arrangement depicting a portion of a capture volume, with the addition of a virtual occluder, according to another embodiment.

Referring to FIG. 12, an arrangement 1200 depicts a portion of a capture volume, with the addition of a virtual occluder 1250, according to another embodiment. A scene volume 1210 may be viewed from a viewing volume 1220. The image data may be captured through the use of a capture rig with a planar tiled camera array represented by a capture surface 1230. The virtual occluder 1250 may have walls 1260 defining a first virtual window 1270, and walls 1280 defining a second virtual window 1290. The walls 1280 may extend outward from the edges of the capture surface 1230, but need not necessarily connect to the walls 1260.

In this manner, the viewing volume 1220 may be extended to a larger, but not infinite size. The size of the viewing volume 1220 may be adequate for the intended viewing experience. The walls 1280 may serve to keep the viewer from viewing the outer edges of the walls 1260, while the walls 1260 may serve to keep the viewer from viewing the edges of the scene volume 1210.

Figure 21:
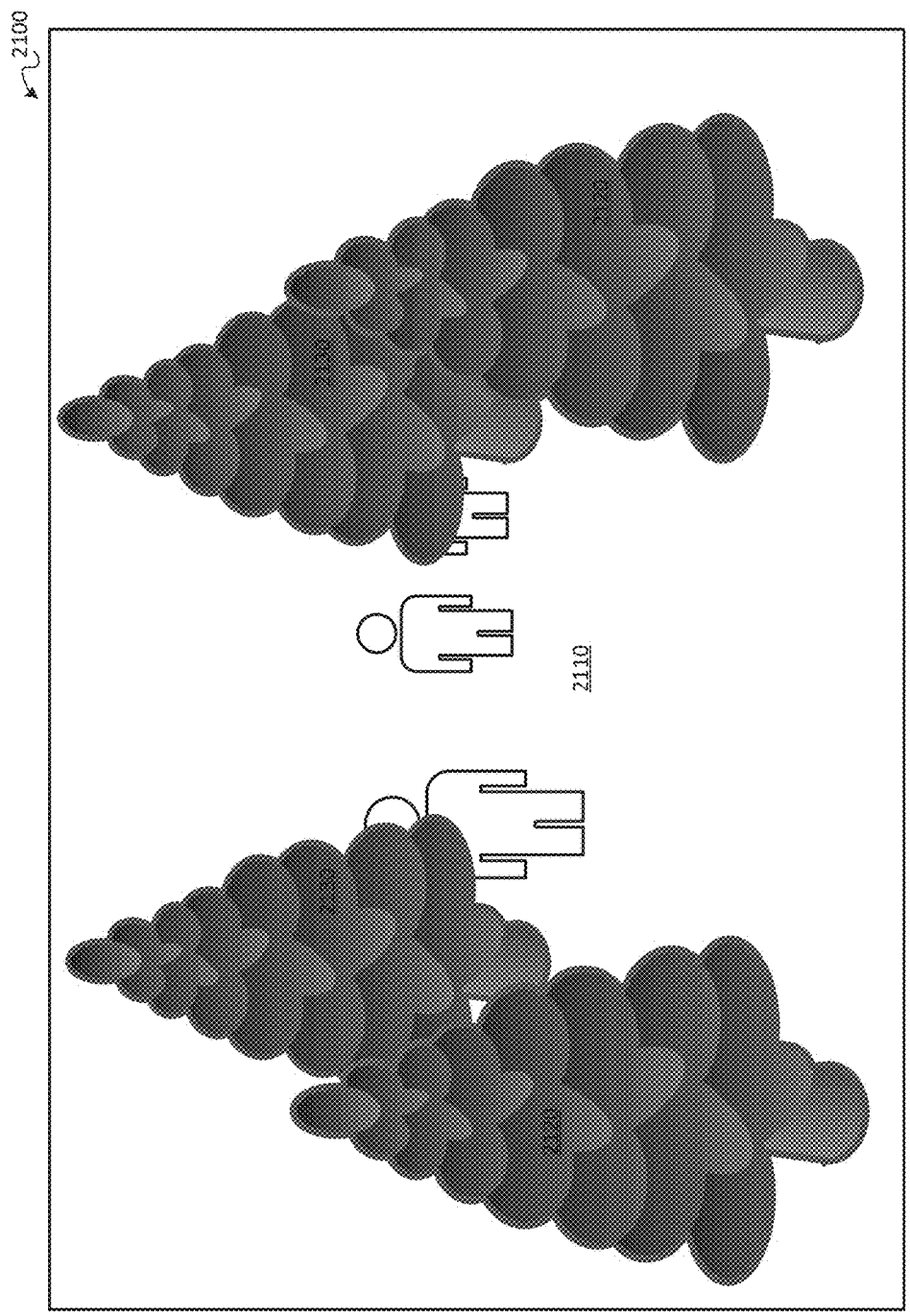
FIG. 21 is a virtual view depicting a scene displayed behind multiple elements and, according to one embodiment.

A virtual occluder of this type may simulate a view that is blocked by foreground and background objects. For example, the walls 1280 may be textured as foreground trees in a forest, while the walls 1260 are textured as background trees in the forest. One example of a virtual view generated with such an arrangement is shown in FIG. 21.

In some embodiments, dynamic virtual occluders may be generated and/or positioned in real-time based on the disposition of the viewer's head. This will be shown and described in connection with FIGS. 13 and 14.

Dynamic Virtual Occluders

Figure 13:
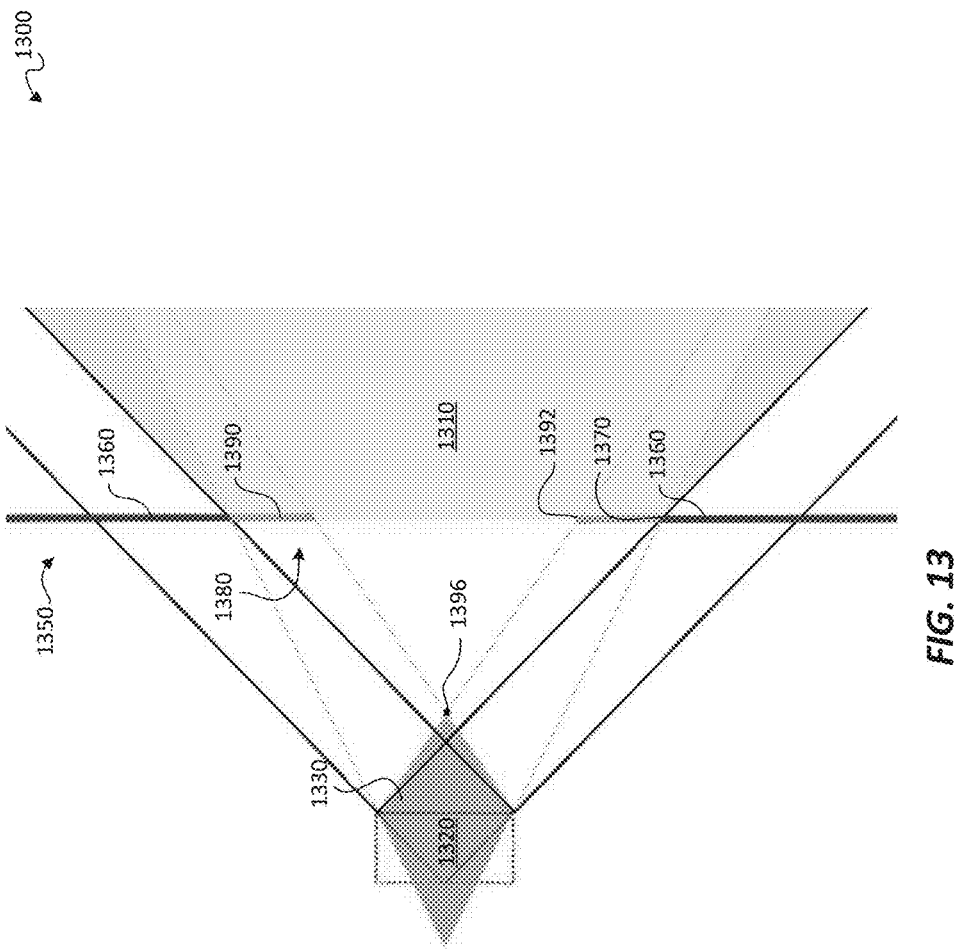
FIG. 13 is an arrangement depicting a portion of a capture volume, with the addition of a static virtual occluder and a dynamic virtual occluder, according to another embodiment.

Referring to FIG. 13, an arrangement 1300 depicts a portion of a capture volume, with the addition of a static virtual occluder 1350 and a dynamic virtual occluder 1380, according to another embodiment. A scene volume 1310 may be viewed from a viewing volume 1320. The image data may be captured through the use of a capture rig with a planar tiled camera array represented by a capture surface 1330. The static virtual occluder 1350 may have walls 1360 defining a static virtual window 1370. The dynamic virtual occluder 1380 may have walls 1390 defining a dynamic virtual window 1392. The dynamic virtual occluder 1380 may extend into the static virtual window 1370 to further limit the portion of the scene volume 1310 that is viewable from a viewpoint 1396 outside the viewing volume 1320.

In at least one embodiment, the dynamic virtual occluder 1380 is only used if the user positions his or her head out of the viewing volume 1320, forward of the capture surface 1330. The dynamic virtual occluder 1380 may be generated and/or positioned in real-time. A dynamic virtual occluder may likewise be used for viewpoints within a viewing volume, if desired.

The size and/or shape of the dynamic virtual occluder 1380 may be determined based on the position of the viewpoint 1396. Thus, the dynamic virtual occluder 1380 may be repositioned and/or resized as needed to compensate for changes in the viewpoint 1396.

Figure 14:
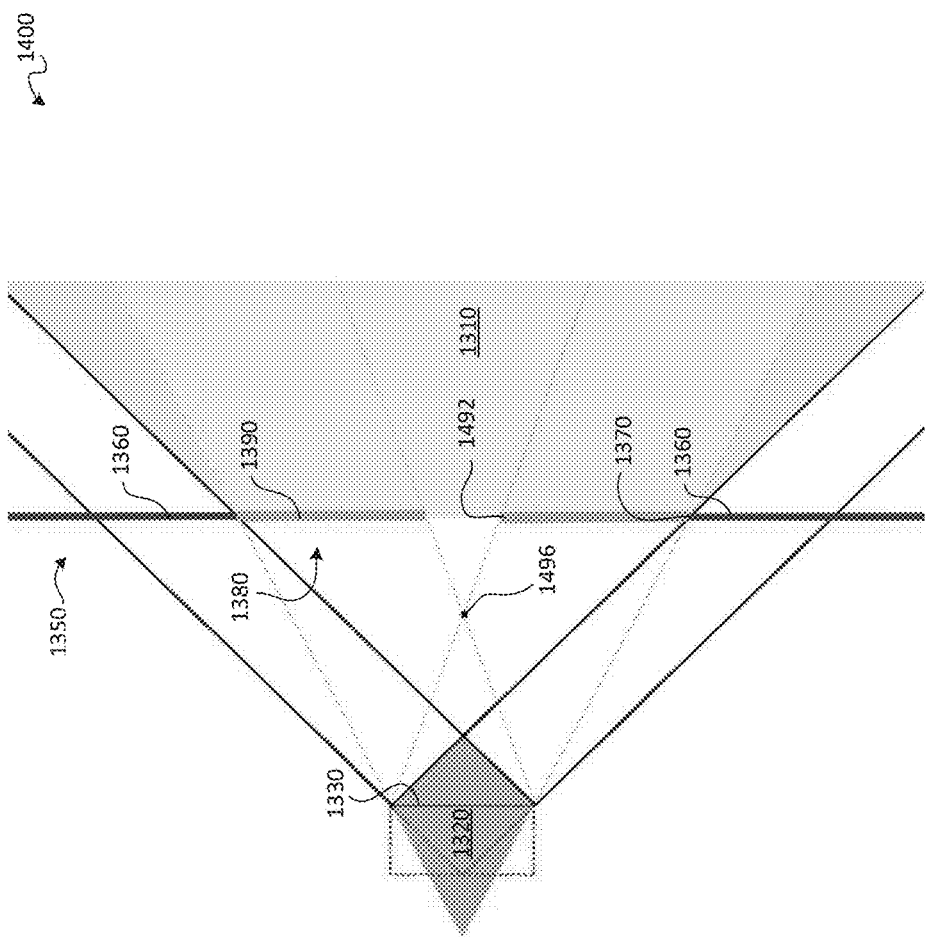
FIG. 14 is an arrangement depicting a portion of the capture volume of FIG. 13, in which the scene volume is to be viewed from a viewpoint different from the viewpoint of FIG. 13.

Referring to FIG. 14, an arrangement 1400 depicts a portion of the capture volume of FIG. 13, in which the scene volume 1310 is to be viewed from a viewpoint 1496 different from the viewpoint 1396 of FIG. 13. The dynamic virtual occluder 1380 been resized such that the walls 1390 extend further into the static virtual window 1370, defining a smaller dynamic virtual window 1492. Thus, in spite of further motion of the viewpoint 1496 away from the viewing volume 1320, the viewer is still unable to see the edges of the scene volume 1310.

FIGS. 8 through 14 have focused on the use of planar capture surfaces. However, in alternative embodiments, other capture surface shapes may be used, such as the semispherical shape of the tiled camera array 600 of FIG. 6. Some examples will be shown and described in connection with FIGS. 15 through 18, as follows.

Inward-Facing Hemispherical Capture Surface

Figure 15:
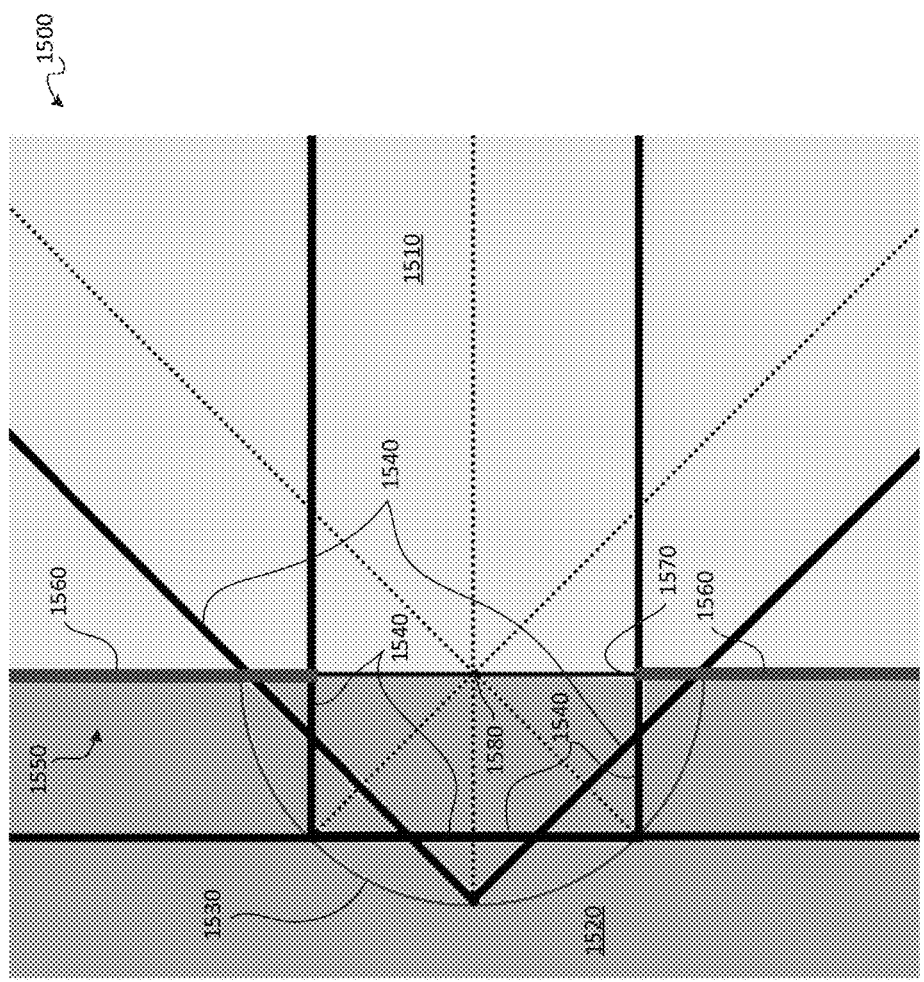
FIG. 15 is an arrangement depicting a portion of a capture volume, with the addition of a virtual occluder, according to another embodiment.

Referring to FIG. 15, an arrangement 1500 depicts a portion of a capture volume, with the addition of a virtual occluder 1550, according to another embodiment. A scene volume 1510 may be viewed from a viewing volume 1520. The image data may be captured through the use of a capture rig with a semispherical tiled camera array represented by a capture surface 1530 with a semispherical shape, like the semispherical shape on which the cameras 610 of FIG. 6 are arranged. The virtual occluder 1550 may have walls 1560 defining a virtual window 1570.

As shown, each of the cameras on the capture surface 1530 may have a field-of-view 1540. Each of the cameras may be oriented perpendicular to the capture surface 1530 so that all of the cameras are oriented toward a common focal point 1580 positioned at the geometric center of the semispherical shape of the capture surface 1530. Thus, the capture rig corresponding to the view of FIG. 15 may be referred to as an "inward facing hemispherical capture rig." The viewing volume 1520 may be infinite all the way to the virtual window 1570.

Use of a hemispherical capture surface like that of FIG. 15 may advantageously be coupled with image data captured with a hemispherical capture rig like the tiled camera array 600 of FIG. 6. The resulting user experience may provide a wider angular variation in the viewpoints that may be used for generation of virtual views, as evidenced by the infinite scope of the viewing volume 1520. The image data captured with such a capture rig may have a high level of detail depicting a relatively small portion of the scene volume. Such an arrangement may be suitable for viewing subject matter of a limited scope from a wide range of viewpoints. For example, a scene within a portal such as a face in a simulated magic mirror may be viewed with such an arrangement.

Outward-Facing Hemispherical Capture Surface

Figure 17:
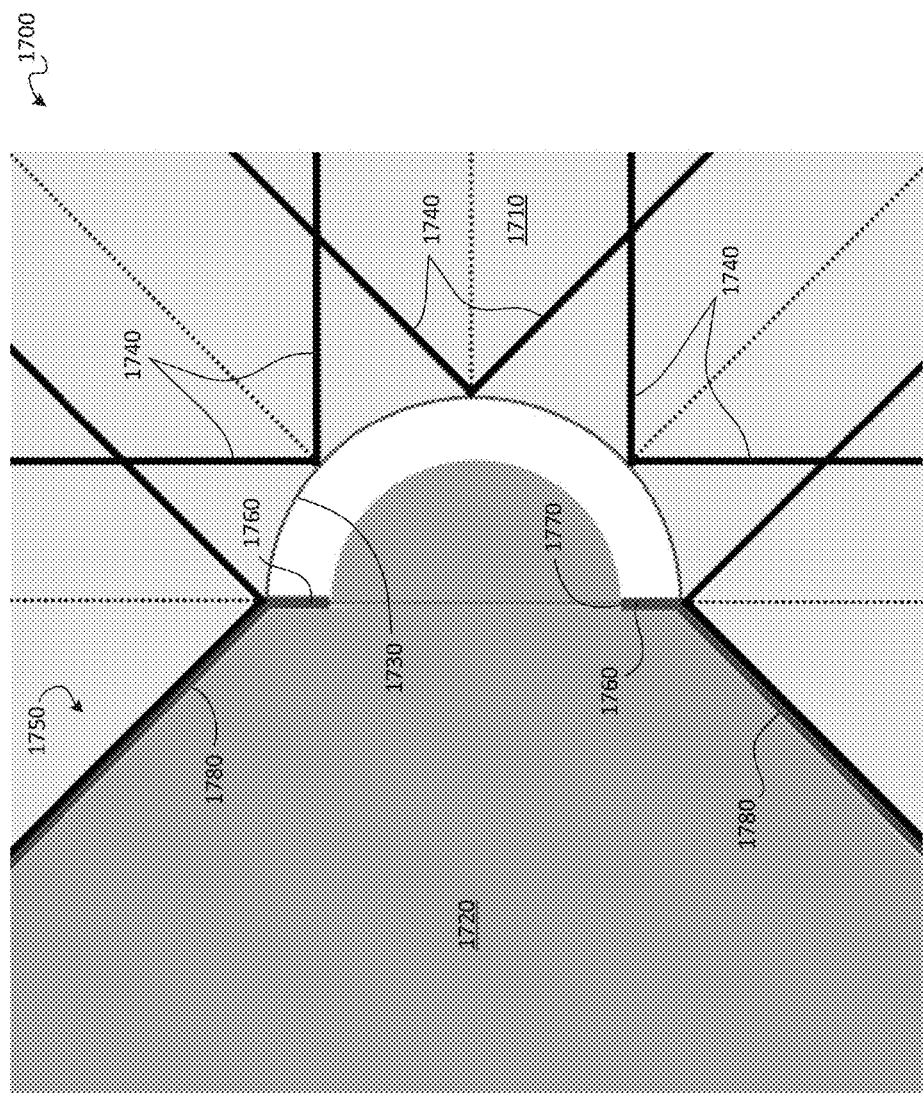
FIG. 17 is an arrangement depicting a portion of a capture volume, with the addition of a virtual occluder, according to another embodiment.

Referring to FIG. 17, an arrangement 1700 depicts a portion of a capture volume, with the addition of a virtual occluder 1750, according to another embodiment. A scene volume 1710 may be viewed from a viewing volume 1720. The image data may be captured through the use of a capture rig with a semispherical tiled camera array represented by a capture surface 1730 with a semispherical shape, like the semispherical shape on which the cameras 610 of FIG. 6 are arranged, but with the cameras facing outward (away from the center of the hemispherical shape), rather than inward.

The virtual occluder 1750 may have walls 1760 defining a virtual window 1770. The virtual occluder 1750 may also have extensions 1780 that help to ensure that the viewer does not see beyond the extents of the scene volume 1710.

Figure 23A:
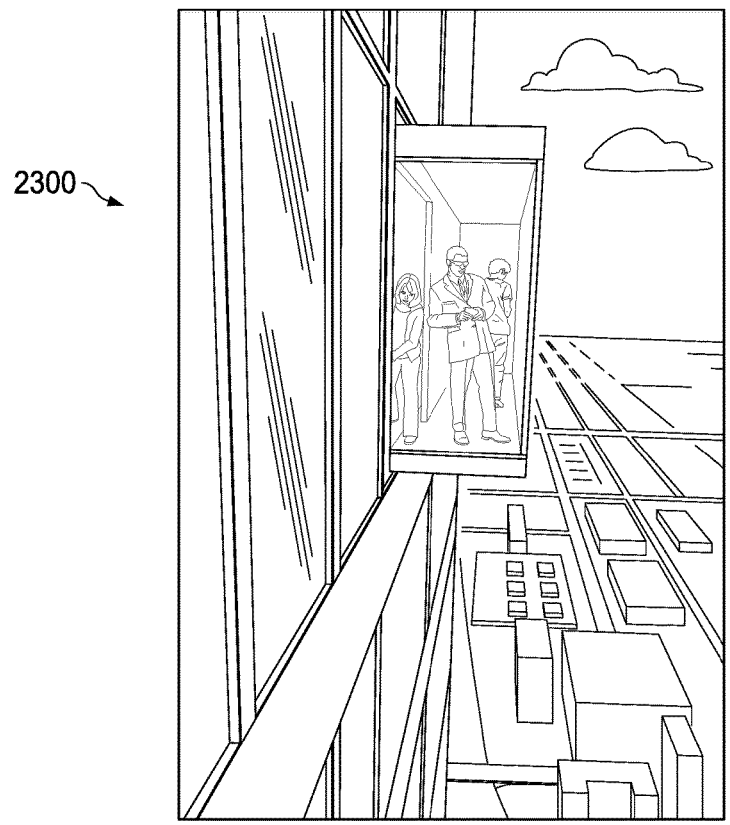
FIGS. 23A and 23B are pictures depicting situations that may beneficially be represented through the use of the configurations of FIG. 17 and/or FIG. 18, according to certain embodiments.
Figure 23B:
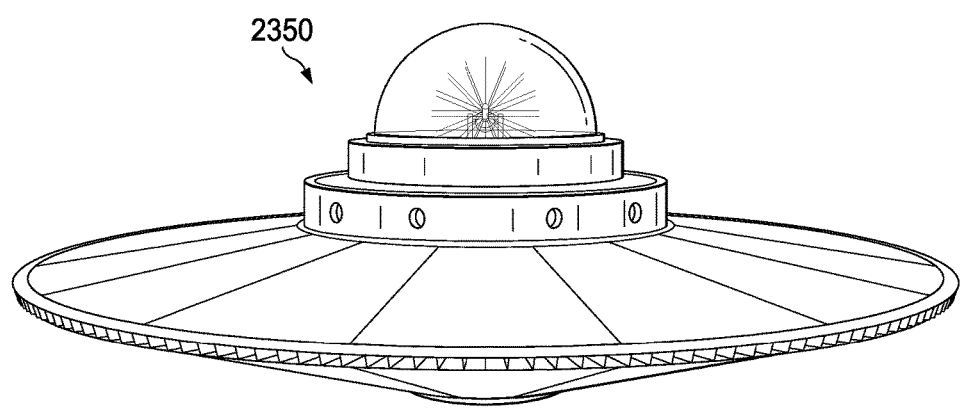

As shown, each of the cameras on the capture surface 1730 may have a field-of-view 1740. Each of the cameras may be oriented such that all of the cameras are oriented away from the geometric center of the capture surface 1730. Consequently, the viewer may have a very large angular range of viewpoints. Such a system may be advantageous for simulating a panoramic view from within an alcove such as a cockpit with a dome-shaped window. Two exemplary situations that may beneficially be represented through the use of the configuration of FIG. 17 are shown in FIGS. 23A and 23B.

In alternative embodiments, the capture rig may be designed such that the cameras face outward or inward from a semispherical capture surface that is more or less than hemispherical. One example will be shown and described in connection with FIG. 18.

Outward-Facing Semispherical Capture Surface

Figure 18:
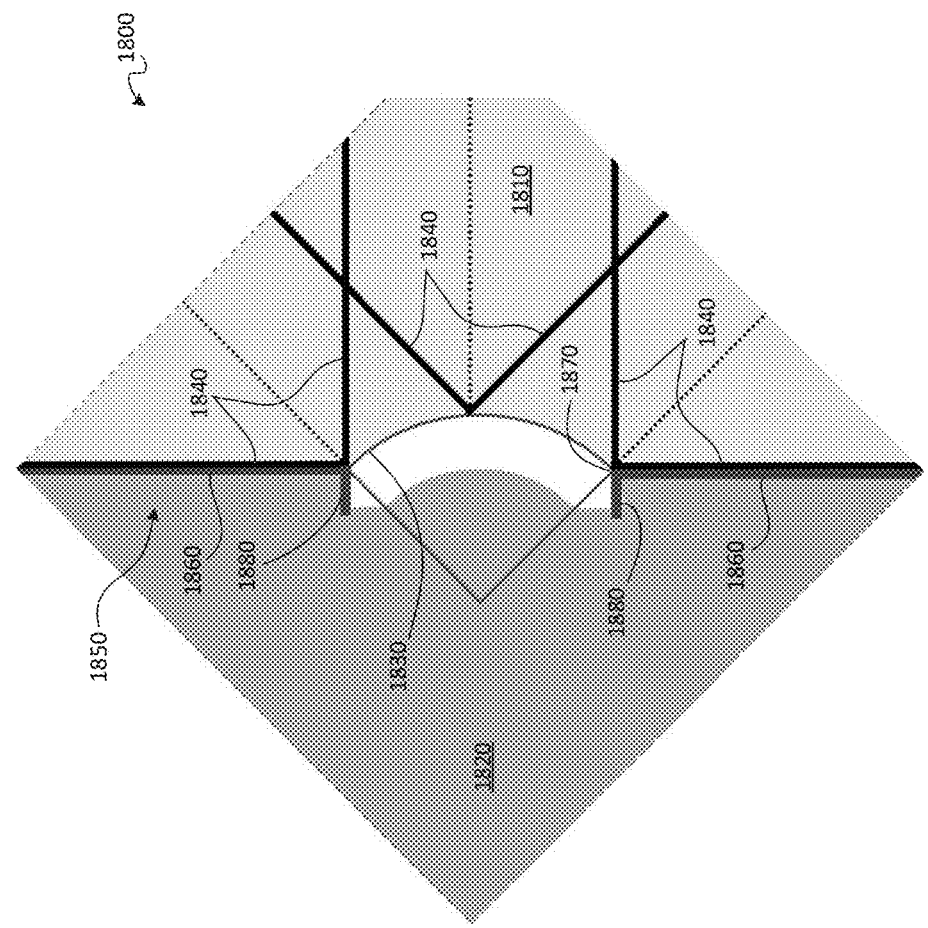
FIG. 18 is an arrangement depicting a portion of a capture volume, with the addition of a virtual occluder, according to another embodiment.

Referring to FIG. 18, an arrangement 1800 depicts a portion of a capture volume, with the addition of a virtual occluder 1850, according to another embodiment. A scene volume 1810 may be viewed from a viewing volume 1820. The image data may be captured through the use of a capture rig with a semispherical tiled camera array represented by a capture surface 1830 with a semispherical shape that is less than hemispherical, with the cameras facing outward (away from the center of the hemispherical shape).

The virtual occluder 1850 may have walls 1860 defining a virtual window 1870. The virtual occluder 1850 may also have extensions 1880 that help to ensure that the viewer does not see beyond the extents of the scene volume 1810.

As shown, each of the cameras on the capture surface 1830 may have a field-of-view 1840. Each of the cameras may be oriented such that all of the cameras are oriented away from the geometric center of the capture surface 1830. Consequently, as in the arrangement of FIG. 17, the viewer may have a very large angular range of viewpoints, although the angular range may not be as large in FIG. 18 as in FIG. 17, due to the fact that the capture surface 1830 sweeps across a smaller angle (for example, 90° rather than 180°). Such a system may be advantageous for simulating a panoramic view from within an alcove such as a cockpit with a dome-shaped window, where the dome-shaped window does not extend as far from the surrounding structure and/or the surrounding structure is generally planar.

Exemplary Virtual Views

A wide variety of virtual views may be generated based on the configurations shown and described in connection with FIGS. 8 through 18. A few exemplary virtual views will be shown and described in connection with FIGS. 19 through 22, as follows.

Referring to FIG. 19, a virtual view 1900 depicts a scene 1910 displayed within a frame 1920, according to one embodiment. The virtual view 1900 may show the scene 1910 bounded by the frame 1920. Texture mapping may be applied to the frame 1920 so that the frame 1920 resembles a picture frame, a stage, a doorway, and/or the like. The virtual view 1900 may be generated, for example, using the configurations of FIG. 9 and/or FIG. 10.

Referring to FIG. 20, a virtual view 2000 depicts a scene 2010 displayed within the interior of a cavity that opens into a scene 2010, according to one embodiment. The scene 2010 may be bounded by the material surrounding the cavity 2020. Texture mapping may be applied to the material surrounding the cavity 2020 so that the interior surface facing the cavity 2020 resembles the rocky interior of a railroad tunnel, a recessed window, a door through a thick wall, or the like. The virtual view 2000 may be generated, for example, using the configuration of FIG. 11.

Referring to FIG. 21, a virtual view 2100 depicts a scene 2110 displayed behind multiple elements 2120 and 2130, according to one embodiment. The elements may include foreground elements 2120 and mid-range elements 2130 behind the foreground elements 2120, but in front of the scene 2110. Texture mapping may be applied to the elements 2120 and/or the elements 2130 so that the elements 2120 and/or the elements 2130 resemble trees, rocks, buildings, and/or the like. Different textures and/or shapes may be used for each of the elements 2120 and/or the elements 2130. The virtual view 2100 may be generated, for example, using the configuration of FIG. 12.

Figure 22:
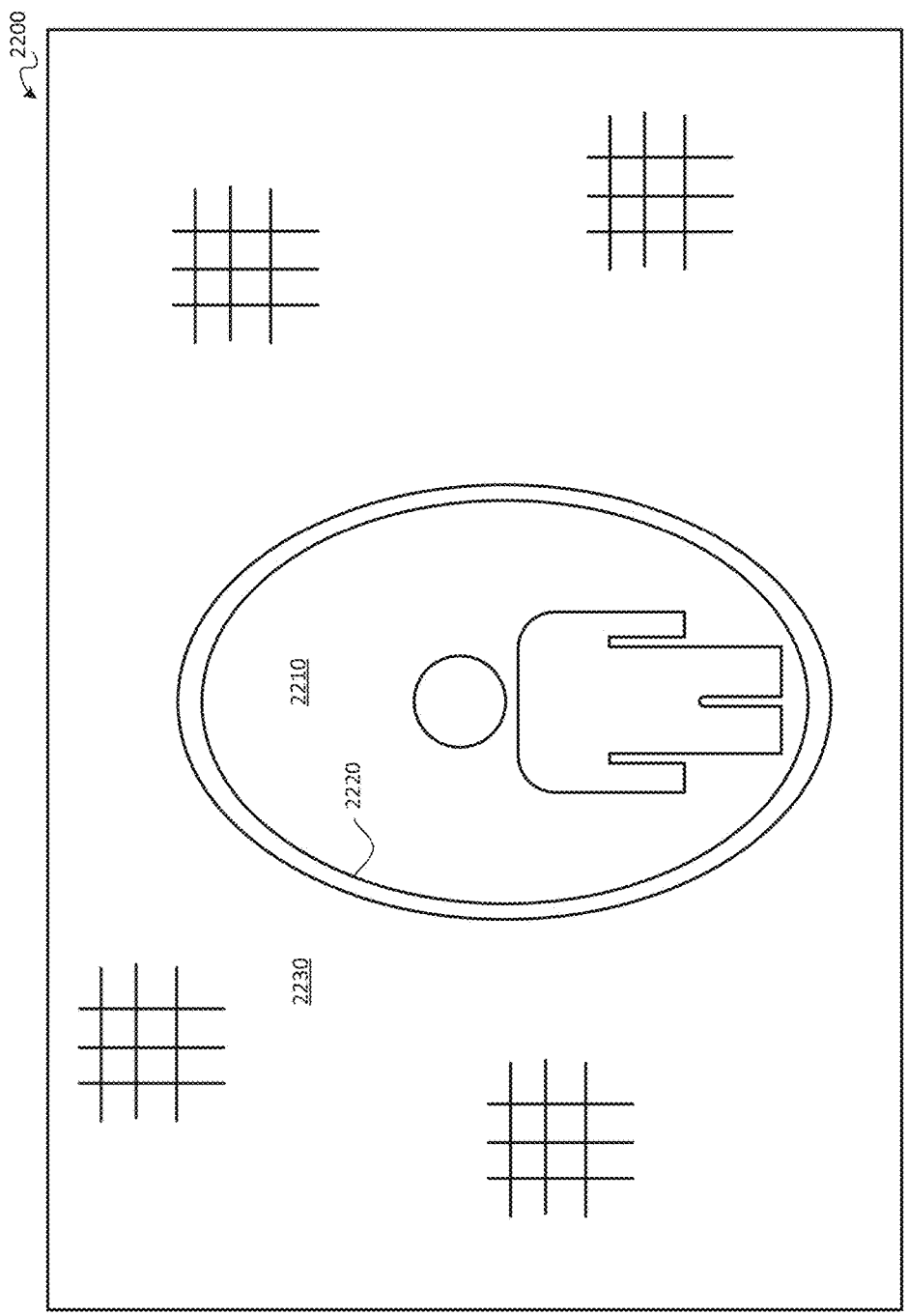
FIG. 22 is a virtual view depicting a scene displayed within the interior of a portal in a wall, through which a scene is visible, according to one embodiment.

Referring to FIG. 22, a virtual view 2200 depicts a scene 2210 displayed within the interior of a portal 2220 in a wall 2230, through which a scene 2210 is visible, according to one embodiment. The scene 2210 may be bounded by the wall 2230. Texture mapping may be applied to the wall 2230 so that the wall 2230 resembles a real wall such as a brick wall, or the like. The virtual view 2200 may be generated, for example, using the configurations of FIG. 15 and/or FIG. 16.

Outward-Facing Semispherical Capture Examples

Referring to FIGS. 23A and 23B, two pictures 2300 and 2350, respectively, depict situations that may beneficially be represented through the use of the configurations of FIG. 17 and/or FIG. 18, according to certain embodiments. In the picture 2300, the view from a glass elevator may be represented with image data captured by a tiled camera array with a semispherical surface with outward-facing cameras. In the picture 2350, the view from a UFO cockpit may similarly be represented by image data captured by a tiled camera array with a semispherical surface with outward-facing cameras.

FIGS. 19 through 23B illustrate only select examples. Those of skill in the art will recognize that the principles and configurations disclosed herein may be applied in a wide variety of other situations to generate a wide variety of virtual views.

Effects

A wide variety of effects may be applied to the display of a virtual occluder in a virtual view. Such effects may enhance the viewer's sense of immersion in the virtual environment. In some embodiments, the virtual occluder(s) may be textured and/or shaped to provide a computer-generated environment. If desired, any of a wide variety of three-dimensional representations, lighting, texturing, and/or texturing techniques may be used, as known in the animation and computer representation arts. Such virtual environments may include, but are not limited to:

A generic environment suitable for any type of content; such an environment may be inexpensive to implement and may be highly reusable;

A genre-oriented environment showing genre-based elements, such as medieval weaponry and horses for fantasy content, high-tech gadgetry for science fiction content, and/or the like;

A TV show, movie series, or IP franchise-based environment showing elements connected to a particular TV show, movie, or IP franchise, such as the Tardis in the case of "Doctor Who," the characters from "CSI," and/or the like; or A scene-dependent environment that is determined based on the particular scene being viewed, such as a view out of the front door of a computer-generated house to the scene content that is on the porch, a view through the glass of an interrogation room in an interrogation scene, or the like.

The viewing window placement and/or size can also be placed at different distances and/or positions depending on the scene. For example:

The virtual window may be placed closer to the viewing volume for more intimate scenes and/or larger parallax effect from the wall(s) of the virtual occluder; and/or The virtual window may be placed further from the viewing volume for a larger scale experience, such as a battle scene.

The virtual window may scale up in size as it moves further from the viewing volume. Conversely, the virtual window may scale down in size as it moves closer to the viewing volume.

A number of computer-generated environment effects may also be applied to change the appearance of the virtual occluder(s) during the course of viewing. Such effects may include, but are not limited to, the following:

Lighting within a room may be modified (for example, by dimming the simulated illumination of the virtual occluder(s) to represent dimming the lights in a room).

Lighting on the virtual occluder may be simulated as though coming from the scene being displayed.

One or more objects from the scene may be shown moving through the virtual window and into the space occupied by the virtual occluder(s). Such objects may then become part of the environment presented by the virtual occluder(s). For example, a baseball, bullets, or arrows may be shown striking and/or bouncing off of the virtual occluder(s) from the scene being viewed.

One or more objects on the virtual occluder(s) may be updated according to the plot of the experience. For example, if a hero in a fantasy setting slays a dragon, a computer-generated replica of the dragon's head may be shown mounted on a wall of the virtual occluder(s).

These are only a few of the many effects that may be used to tie the appearance of the virtual occluder(s) to the content being viewed. Such effects may also serve to enhance the viewer's level of immersion in the content being viewed.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for generating a virtual view of a scene, the method comprising:
   from a tiled array of cameras, receiving image data depicting a capture volume comprising a scene volume having a scene;
   at a processor, defining a scene volume within the capture volume, the scene volume having a scene;
   at the processor, defining a viewing volume;
   at the processor, positioning a virtual occluder at least partially within the capture volume such that a virtual window of the virtual occluder is between the viewing volume and the scene;
   at an input device, receiving input selecting a virtual viewpoint within the viewing volume; and
   at the processor, generating a virtual view depicting the scene from the virtual viewpoint.

2. The method of claim 1, wherein the tiled array of cameras comprises a plurality of cameras arranged in a planar array.

3. The method of claim 1, wherein the tiled array of cameras comprises a plurality of cameras arranged in a semispherical array, with each of the cameras oriented toward a center of the semispherical array.

4. The method of claim 1, wherein the tiled array of cameras comprises a plurality of cameras arranged in a semispherical array, with each of the cameras oriented away from a center of the semispherical array.

5. The method of claim 1, wherein the virtual window is positioned after selection of the virtual viewpoint, at a virtual window location determined by a virtual viewpoint location of the virtual viewpoint.

6. The method of claim 1, wherein positioning the virtual occluder comprises causing the virtual occluder to extend the viewing volume.

7. The method of claim 1, wherein the virtual occluder comprises one or more viewpoint-facing surfaces oriented toward the viewing volume;
   wherein the method further comprises mapping frame scenery on the one or more viewpoint-facing surfaces.

8. The method of claim 7, wherein:
   the frame scenery depicts frame subject matter;
   the scene depicts scene subject matter; and
   the frame subject matter is related to the scene subject matter.

9. The method of claim 7, wherein:
the image data comprises video image data; and
the frame scenery is animated in a manner that corresponds to changes in the video image data.
10. The method of claim 9, wherein:
the video image data depicts a scene change in which illumination of the scene changes; and
the frame scenery is animated to depict a frame scenery change in which illumination of the virtual occluder is simulated;
wherein mapping the frame scenery on the one or more viewpoint-facing surfaces comprises timing the frame scenery change to match timing of the scene change.
11. The method of claim 9, wherein:
the video image data depicts a scene change in which one or more scene objects in the scene change; and
the frame scenery is animated to depict a frame scenery change in which one or more frame objects of the frame scenery change;
wherein mapping the frame scenery on the one or more viewpoint-facing surfaces comprises timing the frame scenery change to match timing of the scene change.
12. The method of claim 1, wherein:
positioning the virtual occluder comprises causing the virtual occluder to block viewing of at least part of the scene volume from at least one portion of the viewing volume;
selecting the virtual viewpoint comprises selecting the virtual viewpoint from within the portion; and
generating the virtual view comprises, in the virtual view, blocking a part of the scene with the virtual occluder.
13. The method of claim 1, wherein:
defining the scene volume comprises defining the scene volume after the viewing volume has been defined; and
defining the scene volume comprises using the viewing volume to ascertain boundaries of the scene volume.
14. The method of claim 1, wherein:
defining the viewing volume comprises defining the viewing volume after the scene volume has been defined; and
defining the viewing volume comprises using the scene volume to ascertain boundaries of the viewing volume.
15. The method of claim 1, wherein:
the input device is part of a virtual reality or augmented reality system; and
receiving input selecting the virtual viewpoint comprises ascertaining at least one of an orientation of a viewer's head and a position of the viewer's head.
16. A method for generating a virtual view of a scene, the method comprising:
from a tiled array of cameras, receiving image data depicting a capture volume comprising a scene volume having a scene;
at a processor, defining a viewing volume;
at the processor, subsequent to defining the viewing volume, defining a scene volume within the capture volume, the scene volume having a scene;
at an input device, receiving input selecting a virtual viewpoint within the viewing volume;
at the processor, generating a virtual view depicting the scene from the virtual viewpoint; and
at the processor, positioning a virtual occluder within the virtual view so as to occlude a boundary of the scene volume that otherwise would be visible from the virtual viewpoint;
wherein defining a scene volume comprises using the viewing volume to ascertain boundaries of the scene volume.
17. A method for generating a virtual view of a scene, the method comprising:
from a tiled array of cameras, receiving image data depicting a capture volume comprising a scene volume having a scene;
at a processor, defining a scene volume within the capture volume, the scene volume having a scene;
at the processor, subsequent to defining the scene volume, defining a viewing volume;
at an input device, receiving input selecting a virtual viewpoint within the viewing volume; and
at the processor, generating a virtual view depicting the scene from the virtual viewpoint;
at the processor, positioning a virtual occluder within the virtual view so as to occlude a boundary of the scene volume that otherwise would be visible from the virtual viewpoint;
wherein defining the viewing volume comprises using the scene volume to ascertain boundaries of the viewing volume.
18. A non-transitory computer-readable medium for generating a virtual view of a scene, comprising instructions stored thereon, that when executed by a processor, perform the steps of:
from a tiled array of cameras, receiving image data depicting a capture volume comprising a scene volume having a scene;
defining a scene volume within the capture volume, the scene volume having a scene;
defining a viewing volume;
positioning a virtual occluder at least partially within the capture volume such that a virtual window of the virtual occluder is between the viewing volume and the scene;
causing an input device to receive input selecting a virtual viewpoint within the viewing volume; and
generating a virtual view depicting the scene from the virtual viewpoint.
19. The non-transitory computer-readable medium of claim 18, wherein the virtual window is positioned after selection of the virtual viewpoint, at a virtual window location determined by a virtual viewpoint location of the virtual viewpoint.
20. The non-transitory computer-readable medium of claim 18, wherein positioning the virtual occluder comprises causing the virtual occluder to extend the viewing volume.
21. The non-transitory computer-readable medium of claim 18, wherein the virtual occluder comprises one or more viewpoint-facing surfaces oriented toward the viewing volume;
wherein the non-transitory computer-readable medium further comprises instructions stored thereon, that when executed by a processor, map frame scenery on the one or more viewpoint-facing surfaces.
22. The non-transitory computer-readable medium of claim 21, wherein:
the frame scenery depicts frame subject matter;
the scene depicts scene subject matter; and
the frame subject matter is related to the scene subject matter.

23. The non-transitory computer-readable medium of claim 21, wherein:
the image data comprises video image data; and
the frame scenery is animated in a manner that corresponds to changes in the video image data.

24. The non-transitory computer-readable medium of claim 23, wherein:
the video image data depicts a scene change in which illumination of the scene changes; and
the frame scenery is animated to depict a frame scenery change in which illumination of the virtual occluder is simulated;
wherein mapping the frame scenery on the one or more viewpoint-facing surfaces comprises timing the frame scenery change to match timing of the scene change.

25. The non-transitory computer-readable medium of claim 23, wherein:
the video image data depicts a scene change in which one or more scene objects in the scene change; and
the frame scenery is animated to depict a frame scenery change in which one or more frame objects of the frame scenery change;
wherein mapping the frame scenery on the one or more viewpoint-facing surfaces comprises timing the frame scenery change to match timing of the scene change.

26. The non-transitory computer-readable medium of claim 18, wherein:
positioning the virtual occluder comprises causing the virtual occluder to block viewing of at least part of the scene volume from at least one portion of the viewing volume;
selecting the virtual viewpoint comprises selecting the virtual viewpoint from within the portion; and
generating the virtual view comprises, in the virtual view, blocking a part of the scene with the virtual occluder.

27. The non-transitory computer-readable medium of claim 18, wherein:
defining the scene volume comprises defining the scene volume after the viewing volume has been defined; and
defining the scene volume comprises using the viewing volume to ascertain boundaries of the scene volume.

28. The non-transitory computer-readable medium of claim 18, wherein:
defining the viewing volume comprises defining the viewing volume after the scene volume has been defined; and
defining the viewing volume comprises using the scene volume to ascertain boundaries of the viewing volume.

29. The non-transitory computer-readable medium of claim 18, wherein:
the input device is part of a virtual reality or augmented reality system; and
causing an input device to receive input selecting the virtual viewpoint comprises ascertaining at least one of an orientation of a viewer's head and a position of the viewer's head.

30. A non-transitory computer-readable medium for generating a virtual view of a scene, comprising instructions stored thereon, that when executed by a processor, perform the steps of:
from a tiled array of cameras, receiving image data depicting a capture volume comprising a scene volume having a scene;
defining a viewing volume;
subsequent to defining the viewing volume, defining a scene volume within the capture volume, the scene volume having a scene;
causing an input device to receive input selecting of a virtual viewpoint within the viewing volume;
generating a virtual view depicting the scene from the virtual viewpoint; and
positioning a virtual occluder within the virtual view so as to occlude a boundary of the scene volume that otherwise would be visible from the virtual viewpoint;
wherein defining a scene volume comprises using the viewing volume to ascertain boundaries of the scene volume.

31. A non-transitory computer-readable medium for generating a virtual view of a scene, comprising instructions stored thereon, that when executed by a processor, perform the steps of:
from a tiled array of cameras, receiving image data depicting a capture volume comprising a scene volume having a scene;
defining a scene volume within the capture volume, the scene volume having a scene;
subsequent to defining the scene volume, defining a viewing volume;
causing an input device to receive input selecting of a virtual viewpoint within the viewing volume;
generating a virtual view depicting the scene from the virtual viewpoint; and
positioning a virtual occluder within the virtual view so as to occlude a boundary of the scene volume that otherwise would be visible from the virtual viewpoint;
wherein defining the viewing volume comprises using the scene volume to ascertain boundaries of the viewing volume.

32. A system for generating a virtual view of a scene, the system comprising:
data storage configured to receive, from a tiled array of cameras, image data depicting a capture volume comprising a scene volume having a scene;
a processor, communicatively coupled to the data storage, configured to:
define a scene volume within the capture volume, the scene volume having a scene;
define a viewing volume; and
position a virtual occluder at least partially within the capture volume such that a virtual window of the virtual occluder is between the viewing volume and the scene; and
an input device, communicatively coupled to the processor, configured to receive input selecting a virtual viewpoint within the viewing volume;
wherein the processor is further configured to generate a virtual view depicting the scene from the virtual viewpoint.

33. The system of claim 32, further comprising the tiled array of cameras, wherein the tiled array of cameras comprises a plurality of cameras arranged in a planar array.

34. The system of claim 32, further comprising the tiled array of cameras, wherein the tiled array of cameras comprises a plurality of cameras arranged in a semispherical array, with each of the cameras oriented toward a center of the semispherical array.

35. The system of claim 32, further comprising the tiled array of cameras, wherein the tiled array of cameras comprises a plurality of cameras arranged in a semispherical array, with each of the cameras oriented away from a center of the semispherical array.

36. The system of claim 32, wherein the processor is further configured to position the virtual window after selection of the virtual viewpoint, at a virtual window location determined by a virtual viewpoint location of the virtual viewpoint.

37. The system of claim 32, wherein the processor is further configured to position the virtual occluder by causing the virtual occluder to extend the viewing volume.

38. The system of claim 32, wherein the virtual occluder comprises one or more viewpoint-facing surfaces; wherein the processor is further configured to position the virtual occluder by orienting the one or more viewpoint-facing surfaces toward the viewing volume;
wherein the processor is further configured to map frame scenery on the one or more viewpoint-facing surfaces.

39. The system of claim 38, wherein:
the frame scenery depicts frame subject matter;
the scene depicts scene subject matter; and
the frame subject matter is related to the scene subject matter.

40. The system of claim 38, wherein:
the image data comprises video image data; and
the frame scenery is animated in a manner that corresponds to changes in the video image data.

41. The system of claim 32, wherein:
the processor is further configured to position the virtual occluder by causing the virtual occluder to block viewing of at least part of the scene volume from at least one portion of the viewing volume;
the input device is further configured to receive input selecting the virtual viewpoint by receiving a selection of the virtual viewpoint from within the portion; and
the processor is further configured to generate the virtual view by, in the virtual view, blocking a part of the scene with the virtual occluder.

42. The system of claim 32, wherein:
the processor is further configured to define the scene volume by defining the scene volume after the viewing volume has been defined; and
the processor is further configured to define the scene volume by using the viewing volume to ascertain boundaries of the scene volume.

43. The system of claim 32, wherein:
the processor is further configured to define the viewing volume by defining the viewing volume after the scene volume has been defined; and
the processor is further configured to define the viewing volume by using the scene volume to ascertain boundaries of the viewing volume.

44. The system of claim 32, wherein:
the input device is part of a virtual reality or augmented reality system; and
the input device is further configured to receive input selecting the virtual viewpoint by ascertaining at least one of an orientation of a viewer's head and a position of the viewer's head.

45. A system for generating a virtual view of a scene, the system comprising:
data storage configured to receive, from a tiled array of cameras, image data depicting a capture volume comprising a scene volume having a scene;
a processor, communicatively coupled to the data storage, configured to:
define a viewing volume; and
subsequent to defining the viewing volume, define a scene volume within the capture volume, the scene volume having a scene; and
an input device, communicatively coupled to the processor, configured to receive input selecting a virtual viewpoint within the viewing volume;
wherein the processor is further configured to generate a virtual view depicting the scene from the virtual viewpoint;
wherein the processor is further configured to position a virtual occluder within the virtual view so as to occlude a boundary of the scene volume that otherwise would be visible from the virtual viewpoint; and
wherein defining a scene volume comprises using the viewing volume to ascertain boundaries of the scene volume.

46. A system for generating a virtual view of a scene, the system comprising:
data storage configured to receive, from a tiled array of cameras, image data depicting a capture volume comprising a scene volume having a scene;
a processor, communicatively coupled to the data storage, configured to:
define a scene volume within the capture volume, the scene volume having a scene; and
subsequent to defining the scene volume, define a viewing volume; and
an input device, communicatively coupled to the processor, configured to receive input selecting a virtual viewpoint within the viewing volume;
wherein the processor is further configured to generate a virtual view depicting the scene from the virtual viewpoint;
wherein the processor is further configured to position a virtual occluder within the virtual view so as to occlude a boundary of the scene volume that otherwise would be visible from the virtual viewpoint; and
wherein defining the viewing volume comprises using the scene volume to ascertain boundaries of the viewing volume.

* * * * *